United States Patent
Shimanaka et al.

(10) Patent No.: US 12,173,105 B2
(45) Date of Patent: Dec. 24, 2024

(54) A-B BLOCK COPOLYMER, POLYMER EMULSION AND WATER-BASED INKJET INK

(71) Applicant: DAINICHISEIKA COLOR & CHEMICALS MFG. CO., LTD., Tokyo (JP)

(72) Inventors: Hiroyuki Shimanaka, Tokyo (JP); Jun Kamabayashi, Tokyo (JP); Akifumi Tanaka, Tokyo (JP); Toshie Okubo, Tokyo (JP); Lu Tian, Tokyo (JP); Yoshikazu Murakami, Tokyo (JP); Sachio Yoshikawa, Tokyo (JP)

(73) Assignee: DAINICHISEIKA COLOR & CHEMICALS MFG. CO., LTD., Tokyo (JP)

( * ) Notice: Subject to any disclaimer, the term of this patent is extended or adjusted under 35 U.S.C. 154(b) by 176 days.

(21) Appl. No.: 18/006,785

(22) PCT Filed: Aug. 12, 2021

(86) PCT No.: PCT/JP2021/029730
§ 371 (c)(1),
(2) Date: Jan. 25, 2023

(87) PCT Pub. No.: WO2022/044825
PCT Pub. Date: Mar. 3, 2022

(65) Prior Publication Data
US 2023/0348651 A1    Nov. 2, 2023

(30) Foreign Application Priority Data

Aug. 25, 2020 (JP) ................. 2020-141665

(51) Int. Cl.
| | |
|---|---|
| *B41J 2/01* | (2006.01) |
| *B41M 5/00* | (2006.01) |
| *C08F 2/24* | (2006.01) |
| *C08F 293/00* | (2006.01) |
| *C09D 11/32* | (2014.01) |
| *C09D 11/326* | (2014.01) |

(52) U.S. Cl.
CPC ......... *C08F 293/00* (2013.01); *B41M 5/0064* (2013.01); *C08F 2/24* (2013.01); *C09D 11/326* (2013.01)

(58) Field of Classification Search
CPC ............ B41J 2/01; C08F 293/00; C08F 2/24; C09D 11/322; C09D 11/30; C09D 11/326; C09D 153/00; B41M 5/0064; B41M 5/0047
See application file for complete search history.

(56) References Cited

U.S. PATENT DOCUMENTS

| | | | |
|---|---|---|---|
| 6,020,400 A | 2/2000 | Anton et al. | |
| 2011/0199420 A1* | 8/2011 | Roberts | C09D 11/326 524/533 |
| 2011/0223529 A1* | 9/2011 | Shimanaka | C09D 11/326 524/561 |
| 2013/0338273 A1* | 12/2013 | Shimanaka | C08F 293/005 524/496 |
| 2016/0060379 A1 | 3/2016 | Farrand et al. | |
| 2020/0199387 A1* | 6/2020 | Utsugi | C08L 33/064 |

FOREIGN PATENT DOCUMENTS

| | | |
|---|---|---|
| JP | 10-195355 | 7/1998 |
| JP | 2003-520279 | 7/2003 |
| JP | 2004-197090 | 7/2004 |
| JP | 2005-179679 | 7/2005 |
| JP | 2010-037419 | 2/2010 |
| JP | 2012-149147 | 8/2012 |
| JP | 2014-040553 | 3/2014 |
| JP | 2014-055263 | 3/2014 |
| JP | 2018-203802 | 12/2018 |
| JP | 2020-105527 | 7/2020 |
| JP | 6886062 | 6/2021 |
| WO | 2015/163321 | 10/2015 |
| WO | 2020/157121 | 8/2020 |

OTHER PUBLICATIONS

International Search Report, issued in the corresponding PCT application No. PCT/JP2021/029730, dated Oct. 19, 2021, 7 pages (including machine translation).

* cited by examiner

*Primary Examiner* — Jason S Uhlenhake
(74) *Attorney, Agent, or Firm* — HSML P.C.

(57) ABSTRACT

The present invention provides an A-B block copolymer that enables preparation of a polymer emulsion useful as a binder component for an aqueous inkjet ink that is excellent in inkjet printability and is capable of forming a printed film excellent in durability, such as adhesiveness and rub resistance, on a substrate to be printed, such as a polyolefin-based plastic film. The block copolymer is an A-B block copolymer satisfying the following requirements (1-1) to (1-3). (1-1) Containing 90% by mass or more of a constituent unit derived from a methacrylate-based monomer or the like. (1-2) The chain A has a constituent unit (A-i) derived from methyl methacrylate or the like and a constituent unit (A-ii) derived from 2-ethylhexyl methacrylate or the like. (1-3) The chain B has a constituent unit (B) derived from methacrylic acid, a constituent unit (B-i) derived from methyl methacrylate or the like, and a constituent unit (B-ii) derived from 2-ethylhexyl methacrylate or the like.

9 Claims, No Drawings

A-B BLOCK COPOLYMER, POLYMER EMULSION AND WATER-BASED INKJET INK

TECHNICAL FIELD

The present invention relates to an A-B block copolymer, a polymer emulsion, and an aqueous inkjet ink.

BACKGROUND ART

In recent years, not only office use and home use, but also various types of printing by an inkjet printing method have been performed in a wide range of applications. For example, in industrial applications, outdoor advertisements, facility signs, displays, POP advertisements, traffic advertisements, and the like produced by the inkjet printing method are adopted as sign displays. Many of these sign displays are produced by printing on a large substrate to be printed using an inkjet recording apparatus. Note that when a sign display is produced, a solvent-based ink is used in many cases (see Patent Literature 1).

The substrate to be printed which is used for image formation is diverse, including paper, plastic films, fibers, ceramics, wood, and glass. As a method of printing on plastic films, such as packages which are used for food, daily necessities, and the like, the gravure printing method using plates has been the mainstream. However, in recent years, there has been a tendency to adopt an inkjet printing method that can print at a high speed on demand from data stored in a personal computer or the like without using a plate. As an ink which is used in the inkjet printing method, an aqueous inkjet inks are becoming the mainstream from the viewpoint of consideration for the environment, or other viewpoints. Then, for aqueous inkjet inks, it is required that a printed film (printed matter) excellent in durability, such as adhesiveness and rub resistance, can be recorded on a substrate to be printed, such as a plastic film.

To an inkjet ink, a binder component for forming a printed film, such as a polymer binder, is usually added. Then, a binder component that is capable of forming a printed film excellent in durability, such as high adhesiveness and rub resistance, on various plastic films and that has favorable inkjet printability (such as high-speed printability and ejection stability) is needed. Further, the binder component to be added to an inkjet ink is also required to have excellent redissolvability. In a recording head of an inkjet recording apparatus, the ink may dry out and easily adhere. That is, the binder component needs to have redissolvability such that even when an ink dries and adheres to a recording head, the binder component can dissolve or disperse in a cleaning liquid or the like and can easily be removed.

Under such circumstances, various film-forming binders have been developed in recent years. For example, a solution or emulsion containing a water-soluble polymer, such as an acrylic polymer, a urethane-based polymer, and a vinyl-based polymer, is known as the binder. However, a water-soluble polymer dissolves in an aqueous medium which is a constituent component of an aqueous ink, and therefore when a water-soluble polymer is used as a binder component, a problem that the viscosity of a resultant ink is high is likely to occur. In addition, there is a water-soluble polymer whose water-solubility is improved by increasing the content of a carboxy group and neutralizing the carboxy group with an alkali substance. Although the redissolvability of such a water-soluble polymer is improved, most of the water-soluble polymer dissolves in an aqueous medium, and therefore the viscosity of an ink is likely to be further increased. Furthermore, the resultant ink is likely to exhibit non-Newtonian viscosity, and the performance of ejection from a recording head may be lowered. In addition, since the amount of carboxy group is large, the water-fastness of a film to be formed may be likely to be lowered.

On the other hand, it has been proposed to reduce the content of the carboxy group and lower the solubility in the aqueous medium, thereby making the polymer into an aqueous dispersion or an emulsion (polymer emulsion), and to use the aqueous dispersion or the emulsion as a binder. When a polymer emulsion is used as a binder, the viscosity of an ink can be reduced, and the water-fastness of a film to be formed can be improved because the content of the carboxy group in the polymer is not large. Furthermore, the polymer itself is hydrophobic, and therefore adhesiveness between the film to be formed and the substrate to be printed can be enhanced. However, such a polymer has poor water solubility, the redissolvability tends to decrease.

For example, as the polymer emulsion which is used as the binder component, an emulsion obtained by emulsion polymerization using a low-molecular-weight surfactant or a reactive surfactant; a self-emulsifying type of emulsion obtained by polymerization with the addition of a small amount of a monomer having a carboxy group, followed by neutralization; and the like have been proposed (see Patent Literatures 2 to 4).

CITATION LIST

Patent Literature

Patent Literature 1: Japanese Patent Laid-Open No. 2014-055263
Patent Literature 2: Japanese Translation of PCT International Application Publication No. 2003-520279
Patent Literature 3: Japanese Patent Laid-Open No. 2004-197090
Patent Literature 4: Japanese Patent Laid-Open No. 2005-179679

SUMMARY OF INVENTION

Technical Problem

The polymers contained in the emulsions proposed in Patent Literatures 2 to 4 and the like have a high molecular weight, and therefore when an ink containing any of these emulsions as a binder component is used, adhesiveness between a film to be formed and a substrate to be printed can be improved to some extent. However, each of the polymers contained in these emulsions, when dried and made into a film, is not easily soluble in an aqueous medium, and therefore there has been a problem that the redispersibility of an ink is likely to be lowered.

The present invention has been completed in view of such problems of the conventional techniques, and an object of the present invention is to provide an A-B block copolymer that enables preparation of a polymer emulsion useful as a binder component for an aqueous inkjet ink that is excellent in inkjet printability, such as high-speed printability, redissolvability, and ejection stability, and that is capable of forming a printed film excellent in durability, such as adhesiveness and rub resistance, on a substrate to be printed, such as a polyolefin-based plastic film.

In addition, another object of the present invention is to provide a polymer emulsion useful as a binder component for an aqueous inkjet ink that is excellent in inkjet printability, such as high-speed printability, redissolvability, and ejection stability, and that is capable of forming a printed film excellent in durability, such as adhesiveness and rub resistance, on a substrate to be printed, such as a polyolefin-based plastic film.

Further, yet another object of the present invention is to provide an aqueous inkjet ink for printing on a plastic film that is excellent in inkjet printability, such as high-speed printability, redissolvability, and ejection stability, and that is capable of forming a printed film excellent in durability, such as adhesiveness and rub resistance, on a substrate to be printed, such as a polyolefin-based plastic film.

Solution to Problem

That is, according to the present invention, an A-B block copolymer described below is provided.

[1] An A-B block copolymer having a chain A and a chain B and satisfying the following requirements (1-1) to (1-3):
  (1-1) comprising 90% by mass or more of a constituent unit derived from at least one selected from the group consisting of methacrylic acid and a methacrylate-based monomer, having a number average molecular weight of 20,000 to 60,000, and having a molecular weight distribution (weight average molecular weight/ number average molecular weight) of 1.8 or less;
  (1-2) the chain A has a constituent unit (A-i) derived from at least one selected from a monomer group (i) consisting of methyl methacrylate, benzyl methacrylate, cyclohexyl methacrylate, and t-butylcyclohexyl methacrylate, and a constituent unit (A-ii) derived from at least one selected from a monomer group (ii) consisting of 2-ethylhexyl methacrylate, lauryl methacrylate, tridecyl methacrylate, stearyl methacrylate, and behenyl methacrylate, a total content of the constituent unit (A-i) and the constituent unit (A-ii) is 80% by mass or more and a content of the constituent unit (A-ii) is 20 to 80% by mass in the chain A, and the chain A has a glass transition temperature of 30° C. or lower, has a number average molecular weight of 15,000 to 50,000, and has a molecular weight distribution (weight average molecular weight/number average molecular weight) of 1.6 or less; and
  (1-3) the chain B has a constituent unit (B) derived from methacrylic acid, a constituent unit (B-i) derived from at least one selected from the monomer group (i) consisting of methyl methacrylate, benzyl methacrylate, cyclohexyl methacrylate, and t-butylcyclohexyl methacrylate, and a constituent unit (B-ii) derived from at least one selected from the monomer group (ii) consisting of 2-ethylhexyl methacrylate, lauryl methacrylate, tridecyl methacrylate, stearyl methacrylate, and behenyl methacrylate, a total content of the constituent unit (B-i) and the constituent unit (B-ii) in the chain (B) is 80% by mass or more based on a total content of the constituent units other than the constituent unit (B), and the chain B has an acid value of 50 to 250 mgKOH/g, and has a number average molecular weight of 1,000 to 10,000.

In addition, according to the present invention, a polymer emulsion described below is provided.

[2] A polymer emulsion to be used as a binder component for an aqueous inkjet ink, wherein the polymer emulsion comprises first emulsion particles obtained in such a way that the A-B block copolymer according to [1] is neutralized with an alkali substance and dispersed by self-emulsification in an aqueous medium, and the first emulsion particles have a number average particle size of 30 to 300 nm.

Further, according to the present invention, an aqueous inkjet ink described below is provided.

[3] An aqueous inkjet ink for printing on a plastic film, the aqueous inkjet ink comprising: a pigment; a polymer binder; water; and a water-soluble organic solvent, wherein the polymer binder comprises a first binder component and a second binder component, the first binder component is the polymer emulsion according to [2], and the second binder component is a polymer emulsion satisfying the following requirements (2-1) to (2-3):
  (2-1) comprising second emulsion particles obtained in such a way that in a second polymer that is at least one selected from the group consisting of polyethylene, polypropylene, poly(α-olefin), and copolymers thereof each having a carboxy group, the carboxy group is neutralized with an alkali substance and is dispersed by self-emulsification in an aqueous medium;
  (2-2) the second polymer has an acid value of 10 to 150 mgKOH/g; and
  (2-3) the second emulsion particles have a number average particle size of 30 to 300 nm.

[4] The aqueous inkjet ink according to [3], wherein a solid content of the polymer binder based on 100 parts by mass of the pigment is 50 to 505 parts by mass, a solid content of the first binder component based on 100 parts by mass of the pigment is 5 to 500 parts by mass, and a solid content of the second binder component based on 100 parts by mass of the pigment is 5 to 500 parts by mass.

[5] The aqueous inkjet ink according to [3] or [4], further comprising a pigment dispersant obtained by neutralizing a vinyl-based polymer having a number average molecular weight of 1,000 to 20,000 and an acid value of 50 to 250 mgKOH/g with an alkali substance, the pigment dispersant being in a finely dispersed or dissolved state.

[6] The aqueous pigment inkjet ink according to [5], wherein the vinyl-based polymer is a block copolymer having a chain C and a chain D and satisfying the following requirements (3-1) to (3-3): (3-1) comprising 901 by mass or more of a constituent unit derived from a methacrylate-based monomer, and having a number average molecular weight of 3,000 to 20,000;
  (3-2) the chain C has a constituent unit (C-i) derived from at least one selected from a monomer group (i) consisting of methyl methacrylate, benzyl methacrylate, cyclohexyl methacrylate, and t-butylcyclohexyl methacrylate, a content of the constituent unit (C-i) in the chain C is 80% by mass or more, and the chain C has a number average molecular weight of 2,000 to 10,000, and has a molecular weight distribution of 1.6 or less; and
  (3-3) the chain D has a constituent unit (D) derived from methacrylic acid and a constituent unit (D-i) derived from at least one selected from the monomer group (i) consisting of methyl methacrylate, benzyl methacrylate, cyclohexyl methacrylate, and t-butylcyclohexyl methacrylate, a content of the constituent unit (D-i) in the chain D is 80% by mass or more, and the chain D has an acid value of 70 to 250 mgKOH/g.

[7] The aqueous inkjet ink according to [5] or [6], wherein a solid content of the pigment dispersant based on 100 parts by mass of the pigment is 5 to 100 parts by mass.

[8] The aqueous inkjet ink according to any one of [3] to [7], wherein the water-soluble organic solvent comprises: propylene glycol; and at least one selected from the group consisting of diethylene glycol monobutyl ether, propylene glycol monomethyl ether, propylene glycol monoethyl ether, propylene glycol monopropyl ether, and dipropylene glycol monomethyl ether, and a content of the water-soluble organic solvent is 3 to 30% by mass.

[9] The aqueous inkjet ink according to any one of [3] to [8], wherein the plastic film is at least one selected from the group consisting of a polyethylene-based substrate and a polypropylene-based substrate.

Advantageous Effects of Invention

The present invention can provide an A-B block copolymer that enables preparation of a polymer emulsion useful as a binder component for an aqueous inkjet ink that is excellent in inkjet printability, such as high-speed printability, redissolvability, and ejection stability, and that is capable of forming a printed film excellent in durability, such as adhesiveness and rub resistance, on a substrate to be printed, such as a polyolefin-based plastic film.

In addition, the present invention can provide a polymer emulsion useful as a binder component for an aqueous inkjet ink that is excellent in inkjet printability, such as high-speed printability, redissolvability, and ejection stability, and that is capable of forming a printed film excellent in durability, such as adhesiveness and rub resistance, on a substrate to be printed, such as a polyolefin-based plastic film.

Further, the present invention can provide an aqueous inkjet ink for printing on a plastic film that is excellent in inkjet printability, such as high-speed printability, redissolvability, and ejection stability, and that is capable of forming a printed film excellent in durability, such as adhesiveness and rub resistance, on a substrate to be printed, such as a polyolefin-based plastic film.

DESCRIPTION OF EMBODIMENTS

<A-B Block Copolymer>

Hereinafter, embodiments of the present invention will be described, but the present invention is not limited to the following embodiments. One embodiment of the A-B block copolymer of the present invention is an A-B block copolymer having a chain A and a chain B and satisfying the following requirements (1-1) to (1-3).

(1-1) Containing 90% by mass or more of a constituent unit derived from at least one selected from the group consisting of methacrylic acid and a methacrylate-based monomer, having a number average molecular weight of 20,000 to 60,000, and having a molecular weight distribution (weight average molecular weight/number average molecular weight) of 1.8 or less.

(1-2) The chain A has a constituent unit (A-i) derived from at least one selected from a monomer group (i) consisting of methyl methacrylate, benzyl methacrylate, cyclohexyl methacrylate, and t-butylcyclohexyl methacrylate, and a constituent unit (A-ii) derived from at least one selected from a monomer group (ii) consisting of 2-ethylhexyl methacrylate, lauryl methacrylate, tridecyl methacrylate, stearyl methacrylate, and behenyl methacrylate, the total content of the constituent unit (A-i) and the constituent unit (A-ii) is 80% by mass or more and the content of the constituent unit (A-ii) is 20 to 80% by mass in the chain A, and the chain A has a glass transition temperature of 30° C. or lower, has a number average molecular weight of 15,000 to 50,000, and has a molecular weight distribution (weight average molecular weight/number average molecular weight) of 1.6 or less.

(1-3) The chain B has a constituent unit (B) derived from methacrylic acid, a constituent unit (B-i) derived from at least one selected from a monomer group (i) consisting of methyl methacrylate, benzyl methacrylate, cyclohexyl methacrylate, and t-butylcyclohexyl methacrylate, and a constituent unit (B-ii) derived from at least one selected from a monomer group (ii) consisting of 2-ethylhexyl methacrylate, lauryl methacrylate, tridecyl methacrylate, stearyl methacrylate, and behenyl methacrylate, the total content of the constituent unit (B-i) and the constituent unit (B-ii) is 80% by mass or more based on the total content of the constituent units other than the constituent unit (B) in the chain B, and the chain B has an acid value of 50 to 250 mgKOH/g, and has a number average molecular weight of 1,000 to 10,000.

(A-B Block Copolymer)

The number average molecular weight (Mn) of the A-B block copolymer in terms of polystyrene, as measured by gel permeation chromatography (GPC), is 20,000 to 60,000, preferably 25,000 to 50,000. By setting the number average molecular weight to fall within the above-described range, a film that has favorable adhesiveness to a polyolefin-based plastic film or the like and is excellent in rub resistance can be formed. When the number average molecular weight is lower than 20,000, the physical properties of a film to be formed cannot be improved sufficiently. On the other hand, when the number average molecular weight of the A-B block copolymer is higher than 60,000, problems, such as that excessive time is needed for polymerizing such an A-B block copolymer and that the particle size of the A-B block copolymer is excessively large, may occur.

The molecular weight distribution (weight average molecular weight (Mw)/number average molecular weight (Mn)) (hereinafter, also referred to as "PDI") of the A-B block copolymer is 1.8 or less, preferably 1.6 or less. When the molecular weight distribution (PDI) of the A-B block copolymer is larger than 1.8, the A-B block copolymer contains a wide range of A-B block copolymers from low-molecular-weight one to large-molecular-weight one, therefore making it difficult to form a film excellent in adhesiveness to a plastic film.

(Chain A)

In the polymer chains forming the A-B block copolymer, the chain A is a polymer chain (polymer block) that changes into a water-insoluble film having durability. The constituent unit (A-i) that is contained in this chain A and is derived from a monomer of the monomer group (i) is a constituent unit that exhibits the adhesiveness and affinity to a plastic film and improves the strength of the film. Then, any of the monomers of the monomer group (i) is highly versatile and relatively inexpensive. In addition, any of the monomers of the monomer group (ii) has a long alkyl chain. The constituent unit (A-ii) derived from a monomer of the monomer group (ii) is a constituent unit that contributes to the softness and plasticity of the film, the affinity and adhesiveness to the substrate, and the affinity to the binder component.

The content of the constituent unit (A-ii) in the chain A is 20 to 80% by mass, preferably 30 to 60% by mass. When the content of the constituent unit (A-ii) in the chain A is less than 20% by mass, the affinity of the chain A to other binder components, such as the second binder component which will be described later, is lowered and the softness of the film is deficient. On the other hand, when the content of the constituent unit (A-ii) in the chain A is more than 80% by mass, the strength of the film is deficient.

The total content of the constituent unit (A-i) and the constituent unit (A-ii) in the chain A is 80% by mass or more, preferably 90% by mass or more, and still more preferably 100% by mass. That is, it is preferable that the chain A be substantially formed with only the constituent unit (A-i) and the constituent unit (A-ii). However, a constituent unit derived from a methacrylate-based monomer (additional methacrylate-based monomer) other than the monomers of the monomer group (i) and the monomer group (ii) may be contained in the chain A as long as the amount is less than 20% by mass. Examples of the additional methacrylate-based monomer include methacrylic acid alkyl esters, such as ethyl methacrylate, butyl methacrylate, t-butyl methacrylate, and hexyl methacrylate; methacrylic acid alicyclic alkyl esters, such as isobornyl methacrylate and dicyclopentanyl methacrylate; glycol-based methacrylic acid esters, such as 2-hydroxyethyl methacrylate, 2-hydroxypropyl methacrylate, butoxyethyl methacrylate, dicyclopentenyloxyethyl methacrylate, polyethylene glycol monomethacrylate, and methacrylic acid polyethylene glycol monomethyl ether; and amino group-containing methacrylates, such as dimethylaminoethyl methacrylate and diethylaminoethyl methacrylate.

A constituent unit derived from methacrylic acid may be contained in the chain A. However, the amount of the constituent unit derived from methacrylic acid in the chain A is preferably set to fall within a range where the chain A does not dissolve in water due to being neutralized. That is, the acid value of the chain A is preferably 50 mgKOH/g or less, more preferably 30 mgKOH/g or less. Further, a constituent unit derived from a methacrylate having a polyethylene glycol chain may be contained in the chain A. However, the amount of the constituent unit derived from a methacrylate having a polyethylene glycol chain in the chain A is preferably set to fall within a range where the chain A does not dissolve in water.

The glass transition temperature (Tg) of the chain A is preferably 30° C. or lower, preferably 10° C. or lower. By setting Tg to 30° C. or lower, the softness of the chain A can be enhanced and an A-B block copolymer that is capable of forming a film excellent in properties, such as softness, flexibility, film-followability, wear resistance, and film-forming properties, can be made. The glass transition temperature (Tg) may be any of a value measured with a differential thermal analyzer (measured value) and a value calculated from Tgs of homopolymers (theoretical value). However, the glass transition temperature (Tg) as used herein is a value calculated from Tgs of homopolymers (theoretical value). For example, in the case of a polymer (copolymer) obtained by copolymerizing x types of monomers, Tg (T(° C.)) of this copolymer can be calculated from the following equation (1) assuming that the mass (g) of each monomer is assumed to be "W1, W2, . . . Wx," and Tg (° C.) of a homopolymer of each monomer is assumed to be "T1, T2, . . . Tx."

$$1/T = W1/(T1+273) + W2/(T2+273) + \ldots Wx/(Tx+273) \quad (1)$$

As the values of Tgs of homopolymers, the values described in "Polymer Handbook Fourth Edition" may be used, or the values in various literatures may be used. In the present specification, the values described in "Polymer Handbook Fourth Edition" are used.

The chain A is a polymer chain that is water-insoluble and changes into a particle in an aqueous medium, and therefore the viscosity of a polymer emulsion containing the A-B block copolymer is lowered. Therefore, when a polymer emulsion using the A-B block copolymer of the present embodiment is added as a binder component to an ink, the viscosity of the ink is not increased excessively and the ejection stability of the ink can be kept in a favorable state. In addition, the A-B block copolymer of the present embodiment is substantially insoluble in water, and therefore by using an ink containing, as a binder component, a polymer emulsion containing this A-B block copolymer, a printed film that exhibits high adhesiveness to a substrate, such as a plastic film, can be formed.

The number average molecular weight of the chain A in terms of polystyrene, as measured by GPC, is 15,000 to 50,000, preferably 17,000 to 40,000. By setting the number average molecular weight of the chain A to the above-described range, a film excellent in performance, such as adhesiveness and rub resistance, can be formed. When the number average molecular weight of the chain A is lower than 15,000, the adhesiveness of the film to be formed to a plastic film or the like is insufficient. On the other hand, when the number average molecular weight of the chain A is higher than 50,000, the particle size of the chain A having changed into a particle may be excessively large, and the polymerization time may be excessively long because of high molecular weight.

The molecular weight distribution (PDI) of the chain A is 1.6 or less, preferably 1.5 or less. When the molecular weight distribution (PDI) of the chain A is more than 1.6, the chain A contains a wide range of chains from low-molecular-weight one to high-molecular-weight one, therefore making it difficult to form a film excellent in adhesiveness to a plastic film.

(Chain B)

In the polymer chains forming the A-B block copolymer, the chain B is a polymer chain (polymer block) containing a constituent unit (B) derived from methacrylic acid. That is, the chain B has a carboxy group and is therefore a polymer chain that has affinity to water and dissolves in water. In an aqueous medium, the chain A that is water-insoluble changes into a particle, and the chain B having dissolved in water stabilizes the chain A having changed into a particle, enabling emulsification and dispersion in the aqueous medium. In addition, the chain B dissolves in water and therefore has a property (redissolvability) of dissolving the A-B block copolymer, even when dried, in water again. Further, the carboxy group forms a hydrogen bond or the like with a substrate, such as a plastic film, and therefore a film excellent in adhesiveness can be formed.

The acid value of the chain B is 50 to 250 mgKOH/g, preferably 55 to 200 mgKOH/g, and still more preferably 75 to 150 mgKOH/g. When the acid value is less than 50 mgKOH/g, the chain B does not dissolve in water, making it difficult to disperse or emulsify the A-B block copolymer in an aqueous medium. On the other hand, when the acid value is more than 250 mgKOH/g, the hydrophilicity of the chain B is excessively high, and therefore the water-fastness and chemical resistance of the film may be lowered.

The total content of the constituent unit (B-i) and the constituent unit (B-ii) in the chain B is 80% by mass or more, preferably 90% by mass or more, and still more preferably 100% by mass, based on the total content of the constituent units other than the constituent unit (B). That is, it is preferable that in the chain B, the parts other than the constituent unit (B) derived from methacrylic acid be substantially formed with only the constituent unit (B-i) and the constituent unit (B-ii). The chain B having the constituent unit (B-i) and the constituent unit (B-ii) has good compatibility with the chain A. In addition, it is considered that the chain B having the constituent unit (B-ii) also has high affinity to the second binder component, which will be described later.

A constituent unit derived from a methacrylate-based monomer (additional methacrylate-based monomer) other than the monomers of the monomer group (i) and the monomer group (ii) may be contained in the chain B. Examples of the additional methacrylate-based monomer include the same as the above-described "additional methacrylate-based monomers."

The number average molecular weight of the chain B in terms of polystyrene, as measured by GPC, is 1,000 to 10,000, preferably 2,000 to 8,000. When the number average molecular weight of the chain B is lower than 1,000, the chain B that is water-soluble is excessively short, so that the dispersibility and emulsification ability for the chain A having changed into a particle may be lowered and the particle size of the whole A-B block copolymer may be large. On the other hand, when the number average molecular weight of the chain B is higher than 10,000, the hydrophilicity is excessively high, so that the water-fastness of the film to be formed may be lowered, and in the case where the A-B block copolymer is blended in an ink or the like, the viscosity of the ink may be excessively increased.

(Production of A-B Block Copolymer)

The A-B block copolymer can be synthesized by a conventionally known method. Among others, polymerization methods having a living characteristic, such as a living anionic polymerization method, a living cationic polymerization method, and a living radical polymerization method, are preferable, and from the viewpoint of conditions, materials, apparatuses, and the like, a living radical polymerization method is particularly preferable. Examples of the living radical polymerization method include an atom transfer radical polymerization method (ATRP method), a reversible addition-fragmentation chain transfer polymerization method (RAFT method), a nitroxide-mediated polymerization method (NMP method), an organotellurium-mediated living radical polymerization method (TERP method), a reversible chain transfer catalyzed polymerization method (RTCP method), and a reversible complexation mediated polymerization method (RCMP method). Among these, the RTCP method and the RCMP method, in which an organic compound is used as a catalyst and an organic iodide is used as a polymerization initiation compound, are preferable. These methods are advantageous in terms of costs and purification because commercially available compounds which are relatively safe are used, and a heavy metal and a special compound are not used. Further, a precise block structure can easily be formed with general facilities by utilizing tertiary iodine in a growth terminal.

The polymerization may be any of thermal polymerization and photopolymerization, and an azo-based radical generator, a peroxide-based radical generator, a photosensitizer, or the like may be added to the polymerization reaction system. The type of polymerization may be any of solventless polymerization, solution polymerization, and emulsion polymerization, and among these, the solution polymerization is preferable. When a polymer emulsion is produced by dispersing a resultant A-B block copolymer in an aqueous medium, an organic solvent which is the same as the water-soluble organic solvent used in the aqueous medium is preferably used in solution polymerization because thereby the reaction solution after the polymerization reaction can be used as it is.

Any of polymerization to obtain the chain A and polymerization to obtain the chain B may be performed first. However, when the polymerization to obtain the chain B is performed first, methacrylic acid may be left in the polymerization system. In this case, a constituent unit derived from methacrylic acid may be introduced in the chain A produced by the subsequent polymerization, and therefore the polymerization to obtain the chain B is preferably performed after the polymerization to obtain the chain A is performed first.

<Polymer Emulsion>

Next, embodiments of the polymer emulsion of the present invention will be described. One embodiment of the polymer emulsion of the present invention is a polymer emulsion to be used as a binder component for an aqueous inkjet ink and contains first emulsion particles obtained in such a way that the above-described A-B block copolymer is neutralized with an alkali substance and dispersed by self-emulsification in an aqueous medium. Then, the number average particle size of the first emulsion particles is 30 to 300 nm.

The number average particle size of the first emulsion is 30 to 300 nm, preferably 50 to 150 nm. When the number average particle size of the first emulsion is smaller than 30 nm, the viscosity of an inkjet ink prepared by blending this polymer emulsion may be excessively high, and the hydrophilicity is high and therefore the physical properties of the film to be formed are lowered. On the other hand, when the number average particle size of the first emulsion is larger than 300 nm, foreign bodies, so-called "aggregates," or the like are likely to be formed in a printed film to be formed. Further, an inkjet ink obtained by blending this polymer emulsion is likely to clog in a nozzle of a recording head, and besides, the ejection performance and filtration performance of the ink may be lowered. The number average particle size of the emulsion particles is a value which is measured and calculated by a dynamic light scattering particle size distribution analyzer.

Examples of the alkali substance that neutralizes the A-B block copolymer include: ammonia; aliphatic primary to tertiary amines, such as monomethylamine, dimethylamine, trimethylamine, monoethylamine, diethylamine, and triethylamine; alcoholamines, such as monoethanolamine, diethanolamine, triethanolamine, monopropanolamine, dipropanolamine, tripropanolamine, methylethanolamine, dimethylethanolamine, and methylisopropylamine; heterocyclic amines, such as piperidine, morpholine, and N-methylmorpholine; and hydroxides of an alkali metal, such as lithium hydroxide, sodium hydroxide, and potassium hydroxide. The amount of the alkali substance is preferably set to an amount such that part or the whole of acidic groups, such as carboxy groups, in the A-B block copolymer are neutralized.

The method for neutralizing, emulsifying, and dispersing the A-B block copolymer is conventionally known. For example, after the A-B block copolymer is synthesized by solution polymerization, alkali water is added to the polymerization solution under stirring, and thereby the A-B block copolymer can be dispersed and emulsified. In addition, the A-B block copolymer taken out by the methods, such as (i) drying; (ii) precipitation in a poor solvent; or (iii) dissolution in water by neutralization, followed by precipitation by addition of an acid; after the polymerization, may be emulsified and dispersed in water while the A-B block copolymer is neutralized, and if necessary, heating may be performed.

<Aqueous Inkjet Ink>

Next, embodiments of an aqueous inkjet ink of the present invention will be described. One embodiment of the aqueous inkjet ink of the present invention (hereinafter, also simply referred to as "inkjet ink" or "ink") is an ink for printing on a plastic film, the ink containing a pigment, a polymer binder, water, and a water-soluble organic solvent. The polymer binder contains a first binder component and a second binder component, and the first binder component is the above-described polymer emulsion. Then, the second binder component is a polymer emulsion satisfying the following requirements (2-1) to (2-3).

(2-1) Containing second emulsion particles obtained in such a way that in a second polymer that is at least one selected from the group consisting of polyethylene, polypropylene, poly(α-olefin), and copolymers thereof each having a carboxy group, the carboxy group is neutralized with an alkali substance and is dispersed by self-emulsification in an aqueous medium;

(2-2) The second polymer has an acid value of 10 to 150 mgKOH/g.

(2-3) the second emulsion particles have a number average particle size of 30 to 300 nm.

(Polymer Binder)

The polymer binder is a component that forms a printed film (dried film) which is formed by applying an ink to a substrate to be printed, and is a polymer component that exhibits effects, such as adhesiveness to a substrate to be printed, such as a plastic film, rub resistance, water-fastness, chemical resistance, solvent resistance, and surface protection performance. The polymer binder which is used for the ink of the present embodiment contains a first binder component and a second binder component. Then, this first binder component is the above-described polymer emulsion.

[First Binder Component]

The polymer emulsion which is used as the first binder component contains first emulsion particles obtained in such a way that the A-B block copolymer is neutralized with an alkali substance and dispersed by self-emulsification in an aqueous medium. As described above, the chain A of the A-B block copolymer is a water-insoluble polymer chain. Therefore, the chain A is a polymer chain that exhibits properties, such as adhesiveness to a plastic film, flexibility, and rub resistance. On the other hand, the chain B of the A-B block copolymer has a carboxy group. By neutralizing and ionizing this carboxy group, the chain B has affinity with water and dissolves in water. Therefore, the chain B is a polymer chain having a function of dispersing and emulsifying the A-B block copolymer in an aqueous medium. In addition, even when the ink dries in a nozzle or the like of a recording head, the ink exhibits favorable redissolvability because the chain B easily dissolves in water. Further, the chain B has a carboxy group and therefore also contributes to an improvement in adhesiveness to a plastic film.

A long-chain alkylene group has been introduced in both of the chain A and the chain B, and therefore by allowing the ink to contain a polymer emulsion using the A-B block copolymer having these chain A and chain B, a soft and flexible printed film that is capable of following a plastic film can be formed. Further, the A-B block copolymer has high affinity to a plastic film, such as a polyolefin-based film, and also has high affinity to the second binder component. Therefore, by using the first binder component and the second binder component together, a synergistic effect can be exhibited.

[Second Binder Component]

The second binder component is a polymer emulsion containing second emulsion particles obtained in such a way that in a polyolefin-based resin (second polymer) having a carboxy group, the carboxy group is neutralized with an alkali substance and is dispersed by self-emulsification in an aqueous medium. The second polymer that forms the second emulsion particles has high affinity to a plastic film, such as a polyolefin-based film. Therefore, by using, as the second binder component, the polymer emulsion containing the second emulsion particles, a printed film having improved adhesiveness to a plastic film can be formed. Further, the second polymer has high hydrophobicity, and therefore a printed film that is unlikely to be stripped and is excellent in durability can be formed.

In addition, the second polymer has a carboxy group, and therefore by using, as the second binder component, the polymer emulsion containing the second emulsion particles, the adhesiveness to a plastic film, such as a polyolefin-based film, can be improved due to hydrogen bonds.

Further, the second polymer also has affinity to the A-B block copolymer that forms the first binder component, and therefore the adhesiveness of a printed film to a plastic film and rub resistance of a printed film can be improved due to a synergistic effect.

The second polymer is at least one selected from the group consisting of polyethylene, polypropylene, poly(α-olefin), and copolymers thereof each having a carboxy group. Specific examples of the polyethylene, polypropylene, poly(α-olefin), and copolymers thereof include homopolymers and copolymers of α-olefins, such as 1-butene, 1-hexene, 1-octene, and 1-octadecene. The second polymer may have a branched structure or may be a block copolymer. The second polymer in which a carboxy group has been introduced can be made by (i) oxidizing; (ii) adding maleic anhydride or the like to; (iii) pyrolyzing; or (iv) copolymerizing acrylic acid or methacrylic acid with; a polymer, such as polyethylene, polypropylene, poly(α-olefin), or a copolymer of thereof.

The acid value of the second polymer is 10 to 150 mgKOH/g, preferably 20 to 100 mgKOH/g. When the acid value of the second polymer is less than 10 mgKOH/g, emulsification cannot be performed sufficiently. On the other hand, when the acid value of the second polymer is more than 150 mgKOH/g, it is difficult to perform emulsification and dispersion, so that the water-fastness of a printed film to be formed is lowered.

The second polymer may be a wax having a number average molecular weight of 10,000 or lower, or may be a polymer having a number average molecular weight of several tens of thousands or higher. The melting point or softening point of the second polymer is usually 0 to 180° C. Note that the melting point of the second polymer is preferably 120° C. or lower because it is more suitable for emulsification to have such a melting point.

The number average particle size of the second emulsion particles formed by the second polymer is 30 to 300 nm, preferably 50 to 120 nm. When the number average particle size of the second emulsion is smaller than 30 nm, the viscosity of the ink is excessively high. On the other hand, when the number average particle size of the second emulsion is larger than 300 nm, the ink is likely to clog in a nozzle of a recording head, and besides, the ejection performance and filtration performance of the ink may be lowered.

The method for emulsifying the second polymer is a conventionally known method. The carboxy group is neutralized by, for example, heating and melt the second polymer, or dissolving the second polymer in a solvent, such as toluene, by heating as necessary, and then adding an aqueous solution or the like of an alkali substance. In the case where a solvent, such as toluene, is used, the used solvent is distilled away. Thereby, the polymer emulsion (the second binder component) containing the second emulsion particles dispersed by self-emulsification in an aqueous medium can be obtained.

(Pigment)

As the pigment, conventionally known organic pigments and inorganic pigments which are used for inkjet inks can be used. Examples of the organic pigments include chromatic color pigments, such as phthalocyanine-based, azo-based, azomethineazo-based, azomethine-based, anthraquinone-based, perinone/perylene-based, indigo/thioindigo-based, dioxazine-based, quinacridone-based, isoindoline-based, isoindolinone-based, diketopyrrolopyrrole-based, quinophthalone-based, and indanthrene-based pigments; and carbon black pigments, such as furnace black, lamp black, acetylene black, and channel black. Examples of the inorganic pigments include extender pigments, titanium oxide-based pigments, iron oxide-based pigments, and spinel pigments.

An organic fine particle pigment is preferably used except for the cases where hiding power is required for printed matter (image). In the cases where high-definition printed matter that shows transparency is necessary, a pigment micronized by wet pulverization, such as salt milling, or by dry pulverization is preferably used. An organic pigment having a number average particle size of 0.2 µm or smaller or an inorganic pigment having a number average particle size of 0.4 µm or smaller, obtained by removing pigments having a particle size of larger than 1.0 µm, is preferably used in view of, for example, avoiding nozzle clogging.

Specific examples of the pigment, when shown by Color Index (C.I.) number, include C.I. Pigment yellow 12, 13, 14, 17, 20, 24, 74, 83, 86, 93, 94, 95, 97, 109, 110, 117, 120, 125, 128, 129, 137, 138, 139, 147, 148, 150, 151, 153, 154, 155, 166, 168, 175, 180, 181, 185, and 191; C.I. Pigment Orange 16, 36, 43, 51, 55, 59, 61, 64, 71, and 73; C.I. Pigment Red 4, 5, 9, 23, 48, 49, 52, 53, 57, 97, 112, 122, 123, 144, 146, 147, 149, 150, 166, 168, 170, 176, 177, 180, 184, 185, 192, 202, 207, 214, 215, 216, 217, 220, 221, 223, 224, 226, 227, 228, 238, 240, 242, 254, 255, 264, 269, and 272; C.I. Pigment Violet 19, 23, 29, 30, 37, 40, and 50; C.I. Pigment Blue 15, 15:1, 15:3, 15:4, 15:6, 22, 60, and 64; C.I. Pigment Green 7 and 36; C.I. Pigment Black 7; and C.I. Pigment White 6.

From the viewpoint of color developability, dispersibility, weatherability, and the like, yellow pigments, such as C.I. Pigment Yellow 74, 83, 109, 128, 139, 150, 151, 154, 155, 180, 181, and 185; red pigments, such as C.I. Pigment Red 122, 170, 176, 177, 185, and 269, and C.I. Pigment Violet 19 and 23; blue pigments, such as C. I. Pigment Blue 15:3, 15:4, and 15:6; black pigments, such as C.I. Pigment Black 7; and white pigments, such as C.I. Pigment White 6, are preferable.

The pigment may be any of an untreated pigment; a self-dispersible pigment having a functional group introduced on the surface thereof; a treated pigment which has been, for example, surface-treated or encapsulated with a surface treating agent, such as a coupling agent or a surfactant, or a polymer or the like. The self-dispersible pigment has an acidic group, such as a carboxy group, a sulfonate group, and a phosphate group, introduced on the surfaces of the pigment particles, and is an easily dispersible pigment that can be dispersed in the ink without using a pigment dispersant by neutralizing these acidic groups to be allowed to have affinity to water. In contrast, the untreated pigment, the surface-treated pigment, and the encapsulated pigment are preferably used together with a pigment dispersant.

The content of the pigment in the ink is preferably 0.1 to 25% by mass, more preferably 0.2 to 20% by mass, based on the total amount of the ink.

(Water)

The inkjet ink of the present embodiment is an aqueous ink containing water as an essential component. As the water, ion-exchanged water, distilled water, purified water, and the like are preferably used. The content of water in the ink is preferably 30 to 90% by mass based on the total amount of the ink.

(Water-Soluble Organic Solvent)

The inkjet ink of the present embodiment contains a water-soluble organic solvent. The ink of the present embodiment is an ink that is used for printing on a plastic film having low ink penetrability. Therefore, as the water-soluble organic solvent, a solvent that not only functions as a humectant but has favorable wettability to a plastic film which is a substrate to be printed is preferably used. Further, a water-soluble organic solvent that can function as a leveling agent for a surface of the substrate to be printed and can also function as a film-forming auxiliary for improving the film-formability of the polymer binder in the ink is preferably used.

Examples of the water-soluble organic solvent include: alcohol-based solvents, such as methanol, ethanol, and isopropanol; ketone-based solvents, such as acetone; alkylene glycol-based solvents, such as ethylene glycol, diethylene glycol, propylene glycol, and dipropylene glycol; alkylene glycol monoalkyl ether-based solvents, such as ethylene glycol methyl ether, diethylene glycol monobutyl ether, propylene glycol monomethyl ether, propylene glycol monopropyl ether, dipropylene glycol monomethyl ether, and tripropylene glycol monomethyl ether; glycerin-based solvents, such as glycerin, diglycerin, and ethylene oxide adducts of glycerin; amide-based solvents, such as 2-pyrrolidone, N-methylpyrrolidone, 3-methoxy-N,N-dimethylpropionamide, and 3-butoxy-N,N-dimethylpropionamide; urea-based solvents, such as tetramethyl urea and dimethylimidazolidinone; and carbonate-based solvents, such as ethylene carbonate and dimethyl carbonate.

When a large amount of the water-soluble organic solvent is left in a printed film which is formed by the polymer binder in the ink applied to a substrate to be printed, the water-fastness of the printed film, the adhesiveness to the substrate to be printed, and the rub resistance may be lowered. In addition, an organic solvent used in synthesizing the polymer binder by a method such as solution polymerization may be directly blended into the ink. Therefore, a water-soluble organic solvent which is highly volatile to a certain extent is preferably used. Specifically, the water-soluble organic solvent preferably contains propylene glycol (boiling point 188° C.) and at least one selected from the group consisting of diethylene glycol monobutyl ether (boiling point 230° C.), propylene glycol monomethyl ether (boiling point 121° C.), propylene glycol monoethyl ether (boiling point 132.8° C.), propylene glycol monopropyl ether (boiling point 150° C.), and dipropylene glycol monomethyl ether (boiling point 89.6° C.).

The content of the water-soluble organic solvent in the ink is preferably 3 to 30% by mass, more preferably 5 to 25% by mass, based on the total amount of the ink. When the content of the water-soluble organic solvent is less than 3% by mass, the ink may be likely to dry, and the function as a leveling agent may be unlikely to be exhibited on the surface of a plastic film. On the other hand, when the content of the water-soluble organic solvent is more than 30% by mass, the viscosity of the ink is high, so that the ejection performance of the ink may be lowered, and the stability of the ink may be lowered. In addition, the polymer binder may be precipitated, and the pigment may aggregate. Further, when the content of the water-soluble organic solvent is excessively large, the water-soluble organic solvent is likely to be left in a printed film, and therefore blocking may be likely to occur, and the physical properties, such as water-fastness and rub resistance of an image, may be lowered.

(Pigment Dispersant)

When a pigment other than the self-dispersible pigment is used, the ink preferably further contains a pigment dispersant that disperses the pigment in the ink. For example, the ink preferably further contains a pigment dispersant obtained by neutralizing a vinyl-based polymer having a number average molecular weight of 1,000 to 20,000 and an acid value of 50 to 250 mgKOH/g with an alkali substance, the pigment dispersant being in a finely dispersed or dissolved state.

The vinyl-based polymer preferably has an acidic group, such as a carboxy group, a sulfonate group, and a phosphate group. The vinyl-based polymer can be finely dispersed or dissolved in the ink by neutralizing the acidic group, such as a carboxy group, with an alkali substance to allow the acidic group to have affinity to water. The vinyl-based polymer having an acidic group has a constituent unit derived from a monomer having an acidic group. Examples of the monomer having an acidic group include (meth)acrylic acid, maleic acid, maleic anhydride, itaconic acid, itaconic anhydride, styrene carboxylic acid, a monomer obtained by reacting a carboxylic anhydride, a dibasic acid, or a polycarboxylic acid with a (meth)acrylate-based monomer having a hydroxy group, thereby forming a monoester, vinylsulfonic acid, acrylamide methyl propyne sulfonic acid, vinylphosphonic acid, and methacryloyloxyethyl phosphate.

The vinyl-based polymer has a constituent unit derived from a vinyl-based monomer. Examples of the vinyl-based monomer include: aromatic vinyl monomers, such as styrene, vinyltoluene, and vinylnaphthalene; acrylate-based monomers, such as butyl acrylate and 2-ethylhexyl acrylate; the above-described "additional methacrylate-based monomers;" vinyl ester-based monomers, such as vinyl acetate; a heterocyclic vinyl monomers, such as vinylpyridine and vinylimidazole.

Specific examples of the vinyl-based polymer include a styrene-acrylic acid copolymer, a styrene-maleic acid copolymer, a styrene-ethyl acrylate-acrylic acid copolymer, a styrene-acrylic acid-ethoxyethyl acrylate copolymer, a styrene-methacrylic acid copolymer, a styrene-methacrylic acid-2-hydroxyethyl methacrylate copolymer, a benzyl methacrylate-methacrylic acid copolymer, a styrene-methacrylic acid-dimethylaminoethyl methacrylate-butyl acrylate copolymer, a styrene-maleic acid-amidation product of a polyethylene glycol propylene glycol monobutyl ether monoamine of maleic acid copolymer, a styrene-methyl methacrylate-2-ethylhexyl methacrylate-methacrylic acid copolymer.

The number average molecular weight of the vinyl-based polymer which is used as the pigment dispersant is preferably 1,000 to 20,000, more preferably 3,000 to 15,000, and particularly preferably 5,000 to 13,000. When the number average molecular weight of the vinyl-based polymer is lower than 1,000, the adsorptivity to the pigment may be deficient, and the strength of a printed film to be formed may be lowered. On the other hand, when the number average molecular weight of the vinyl-based polymer is higher than 20,000, the viscosity of the ink is excessively increased, and the ink is likely to show non-Newtonian viscosity, so that the ejection stability of the ink may be lowered.

The acid value of the vinyl-based polymer which is used as the pigment dispersant is preferably 50 to 250 mgKOH/g, more preferably 75 to 150 mgKOH/g, and particularly preferably 85 to 130 mgKOH/g. When the acid value of the vinyl-based polymer is less than 50 mgKOH/g, it is hard to dissolve the vinyl-based polymer, even when neutralized with an alkali substance, in water so that a function as the pigment dispersant may be deficient. On the other hand, when the acid value of the vinyl-based polymer is more than 250 mgKOH/g, the water-solubility may be excessively high. Accordingly, the viscosity of the ink is excessively increased, and the amount of the acidic group that is hydrophilic, such as a carboxy group, is large, and therefore water-fastness of a printed film to be formed may be lowered.

The vinyl-based polymer can be synthesized according to a conventionally known method. For example, the vinyl-based polymer can be obtained by, in the presence of an azo-based initiator, such as azobisisobutyronitrile, or a peroxide-based initiator, such as benzoyl peroxide, bulk polymerization of monomers alone, emulsion polymerization, or solution polymerization using a water-soluble organic solvent for the inkjet ink. Then, by neutralizing the resultant vinyl-based polymer with an alkali substance, the vinyl-based polymer can be made into the pigment dispersant. Further, a polymer-treated pigment may be prepared in such a way that a solution of the pigment dispersant is mixed with a pigment, the resultant mixture is then added to a poor solvent or treated with an acid to precipitate the pigment dispersant, thereby treating or encapsulating the pigment. As a polymerization method for producing the vinyl-based polymer, a living radical polymerization method is preferable. The vinyl-based polymer may be any of polymers having a higher-order structure, such as a random copolymer, a block copolymer, a graft copolymer, a gradient copolymer, a star-shaped polymer, and a dendrimer.

The vinyl-based polymer which is used as the pigment dispersant is preferably a block copolymer having a chain C and a chain D, and satisfying the following requirements (3-1) to (3-3). Such a block copolymer is preferable because the compatibility with and affinity to the A-B block copolymer which is used as the first binder component are favorable.

(3-1) Containing 90% by mass or more of a constituent unit derived from a methacrylate-based monomer, and having a number average molecular weight of 3,000 to 20,000.

(3-2) The chain C has a constituent unit (C-i) derived from at least one selected from a monomer group (i) consisting of methyl methacrylate, benzyl methacrylate, cyclohexyl methacrylate, and t-butylcyclohexyl methacrylate, a content of the constituent unit (C-i) in the chain C is 80% by mass or more, and the chain C has a number average molecular weight of 2,000 to 10,000, and has a molecular weight distribution of 1.6 or less.

(3-3) The chain D has a constituent unit (D) derived from methacrylic acid and a constituent unit (D-i) derived from at least one selected from the monomer group (i) consisting of methyl methacrylate, benzyl methacrylate, cyclohexyl methacrylate, and t-butylcyclohexyl methacrylate, a content of the constituent unit (D-i) in the chain D is 80'% by mass or more, and the chain D has an acid value of 70 to 250 mgKOH/g.

The chain C is a water-insoluble polymer chain and is a polymer block that adsorbs to the pigment and encapsulates the pigment. The chain D is a polymer chain having a carboxy group and is a water-soluble polymer block. The chain C adsorbs to the pigment and the chain D dissolves in water, which prevents approximation of the pigment particles, and therefore a high level of dispersion stability can be imparted. In addition, the chain D is a water-soluble polymer block and therefore can dissolve the ink, even when drying, in an aqueous medium again.

The number average molecular weight of the block copolymer is preferably 3,000 to 20,000, more preferably 4,000 to 15,000. When the number average molecular weight of the block copolymer is lower than 3,000, the dispersion stability may be insufficient. On the other hand, when the number average molecular weight of the block copolymer is higher than 20,000, the viscosity of the ink is likely to be excessively increased, and the adsorptivity to the pigment may be likely to be lowered.

The chain C has 80% by mass or more of the constituent unit (C-i) derived from at least one selected from the above-described monomer group (i) and therefore has high compatibility with the A-B block copolymer which is used as the first binder component, so that the aggregation or precipitation of the chain C is unlikely to occur in the ink. The number average molecular weight of the chain C is 2,000 to 10,000, preferably 2,500 to 7,500. When the number average molecular weight of the chain C is lower than 2,000, the encapsulation of the pigment may be insufficient and dispersion stability may be somewhat lowered. On the other hand, when the number average molecular weight of the chain C is higher than 10,000, the adsorptivity to the pigment is likely to lowered, which may make the encapsulation difficult. The molecular weight distribution of the chain C is 1.6 or less, preferably 1.2 to 1.5. That is, by making the molecular weight uniform to a certain extent, the adsorptivity to the pigment can be improved.

The chain D has a constituent unit (D) derived from methacrylic acid and a constituent unit (D-i) derived from at least one selected from the above-described monomer group (i). The chain D, as well as the chain C, has a constituent unit (D-i) derived from at least one selected from the above-described monomer group (i) and therefore has high compatibility with the A-B block copolymer which is used as the first binder component. The above-described copolymer having a chain C and a chain D is preferably synthesized by a living radical polymerization method because the molecular weight can be made uniform to a certain extent.

(Additional Components)

The ink can contain a surfactant. By allowing the ink to contain a surfactant, the surface tension of the ink can be kept at a predetermined value. Note that the surface tension of the ink is preferably 15 to 45 mN/m, more preferably 20 to 40 mN/m. Examples of the surfactant include silicone-based, acetylene glycol-based, fluorine-based, alkylene oxide-based, and hydrocarbon-based surfactants. Among these, fluorine-based surfactants are preferable. Generally, a surfactant may cause an ink to foam or cause an ink to be repelled on a surface of a film. Further, use of a surfactant may cause the pigment to be likely to aggregate, and therefore it is preferable to suppress the addition amount of the surfactant.

The ink can contain an antiseptic. Examples of the antiseptic include sodium benzoate, benzimidazole, thiabendazole, potassium sorbate, sodium sorbate, sodium dehydroacetate, thiazosulfamide, and pyridine thiol oxide. The content of the antiseptic in the ink is preferably 0.05 to 2.0% by mass, more preferably 0.1 to 1.0% by mass, based on the total amount of the ink.

In addition, if necessary, the ink can contain an organic solvent other than the above-described water-soluble organic solvents, and additives, such as a leveling agent, a surface tension modifier, a pH modifier, an ultraviolet absorber, a light stabilizer, an antioxidant, a dye, a filler, wax, a thickener, a defoaming agent, a fungicide, an antistatic agent, a metal fine particle, and a magnetic powder.

(Production of Aqueous Inkjet Ink)

The solid content of the polymer binder in the ink, based on 100 parts by mass of the pigment, is preferably 50 to 505 parts by mass, more preferably 100 to 400 parts by mass. When the solid content of the polymer binder based on 100 parts by mass of the pigment is less than 50 parts by mass, the adhesiveness and rub resistance of a printed film to be formed to a plastic film may be somewhat deficient. On the other hand, when the solid content of the polymer binder based on 100 parts by mass of the pigment is more than 505 parts by mass, the pigment concentration is relatively lowered, and therefore the color developability or the like of an image may be somewhat lowered.

The solid content of the first binder component in the ink, based on 100 parts by mass of the pigment, is preferably 5 to 500 parts by mass, and the solid content of the second binder component in the ink, based on 100 parts by mass of the pigment, is preferably 5 to 500 parts by mass. That is, the mass ratio of the solid content of the first binder component to the solid content of the second binder component in the ink is preferably within a range of first:second=5 to 500:500 to 5, more preferably within a range of first:second=50 to 400:10 to 200. By setting the mass ratio of the solid content of the first binder component to the solid content of the second binder component to fall within the above-described range, a favorable printed film can be formed.

The solid content of the pigment dispersant in the ink, based on 100 parts by mass of the pigment, is preferably 5 to 100 parts by mass, more preferably 7.5 to 50 parts by mass. When the content of the pigment dispersant based on 100 parts by mass of the pigment is less than 5 parts by mass, the dispersion stability of the pigment may be insufficient. On the other hand, when the content of the pigment dispersant based on 100 parts by mass of the pigment is more than 100 parts by mass, the content of the low-molecular-weight polymer (pigment dispersant) is relatively large, and therefore the physical properties and durability of a printed film may be somewhat lowered.

The inkjet ink of the present embodiment can be produced according to a conventionally known method. Hereinafter, a series of procedures to produce the ink is exemplified. First of all, a pigment dispersion containing a pigment and a pigment dispersant is prepared. Specifically, a mixture containing water, a pigment, and a pigment dispersant, and, if necessary, further contains a water-soluble organic solvent is obtained. The obtained mixture is treated using a paint shaker, a ball mill, an attritor, a sand mill, a horizontal media mill, a colloid mill, a roll mill or the like to finely disperse the pigment, and thus a pigment dispersion is obtained. Subsequently, to the obtained pigment dispersion, water, a polymer binder, a water-soluble organic solvent, and additional additives and the like which are used as necessary are added, and an alkali substance or the like is further added to adjust pH. Further, additives, such as a surfactant and an antiseptic, are added as necessary, and thus the intended ink of the present embodiment can be obtained. Coarse particles and aggregates are preferably removed from the pigment dispersion and the ink by a centrifugal separation treatment or filtration with a filter.

The viscosity of the ink is suitably adjusted such that the ink can be ejected from nozzles of a recording head by an inkjet method according to the type of the pigment, and the like. For example, the viscosity of the ink in the case where an organic pigment is used is preferably 2 to 10 mPa·s. In addition, the viscosity of the ink in the case where an inorganic pigment is used is preferably 5 to 30 mPa·s.

pH of the ink is preferably 7.0 to 10.0, more preferably 7.5 to 9.5. When pH of the ink is lower than 7.0, the polymer binder may be likely to be precipitated and the pigment may be likely to aggregate. On the other hand, when pH of the ink is higher than 10.0, the alkalinity is strong, which may make the ink hard to handle.

(Substrate to be Printed)

By using the inkjet ink of the present embodiment, an image can be recorded (printed) by an inkjet recording method on various substrates to be printed. Among others, even on polyolefin-based plastic films, such as a polyethylene-based substrate and a polypropylene-based substrate, a printed film excellent in durability, such as adhesiveness and rub resistance, can be formed, and therefore the ink of the present embodiment is suitable as an inkjet ink for printing on a plastic film.

Examples of the plastic which is a material for forming a plastic film include various resins, such as polyolefin-based, polyester-based, polyamide-based, polyvinyl halide-based, cellulose-based, polystyrene-based, polymethacrylate-based, polyacrylonitrile-based, polycarbonate-based, polyimide-based, polyvinyl acetal-based, and polyvinyl alcohol-based resins. Examples of the polyolefin-based resin include low density polyethylene, medium density polyethylene, high density polyethylene, polypropylene, poly(α-olefin), poly(ethylene-vinyl acetate), poly(ethylene-vinyl alcohol), and polycycloolefin. Examples of the polyester-based resin include polyethylene terephthalate, polybutylene terephthalate, polyethylene naphthalate, and polylactic acid. Examples of the polyamide-based resin include nylon 6, nylon 66, and nylon 610. Examples of the polyvinyl halide-based resin include polyvinyl chloride, polyvinylidene chloride, and polyfluoroethylene. Among others, it is preferable to print on a film made of a polyolefin-based resin which is inexpensive and easily available and on which it is generally difficult to form a printed film excellent in adhesiveness and rub resistance, more preferably on a film made of a polyethylene-based resin or a film made of a polypropylene-based resin.

The plastic film may be non-stretched one or may be stretched one, such as uniaxially stretched or biaxially stretched one. The surface (print side) of the plastic film may be non-treated or may be surface-treated by a plasma treatment, a corona treatment, a radiation treatment, a silane coupling treatment, or the like. The plastic film may have a single-layered structure or a multi-layered structure, or may be one on which aluminum deposition or transparent deposition has been performed. The thickness of the plastic film is preferably 1 to 500 μm, more preferably 5 to 200 μm. The plastic film may be colored with a pigment or a dye, or may be one to which a reinforcement filler, such as carbon black, silica, calcium carbonate, a glass fiber, or a cellulose nanofiber, has been added.

EXAMPLES

Hereinafter, the present invention will specifically be described based on Examples, but the present invention is not limited to these Examples. Note that each of "parts" and "%" in Examples and Comparative Examples is on a mass basis unless otherwise noted.

<Production of Polymer Emulsion (First Binder Component)>

Synthesis Example 1

In a reaction container equipped with a stirrer, a back-flow condenser, a thermometer, and a nitrogen-introducing pipe, 252.8 parts of diethylene glycol monobutyl ether (BDG), 0.4 parts of iodine, 1.4 parts of 2,2-azobis(4-methoxy-2,4-dimethylvarelonitrile) (trade name "V-70," manufactured by FUJIFILM Wako Pure Chemical Corporation) (V-70), 0.1 parts of diphenylmethane (DPM), 80.4 parts of benzyl methacrylate (BzMA), 90.5 parts of 2-ethylhexyl methacrylate (EHMA), and 15.2 parts of 2-hydroxyethyl methacrylate (HEMA) were placed. The resultant mixture was stirred under nitrogen bubbling and heated to 45° C. to perform polymerization for 4.5 hours, and thus a polymer (chain A) was synthesized. The solid content, as measured by sampling part of the reaction solution, was 33.5%, and the conversion rate of the polymerization, calculated based on the solid content, was 78.5%. The number average molecular weight (Mn) in terms of polystyrene and polydispersity index (PDI) of the chain A, as measured by GPC using tetrahydrofuran (THF) as a developing solvent, were 26,000 and 1.28, respectively.

The temperature of the obtained solution of the chain A was lowered to 40° C., and then 1.9 parts of V-70, 11.8 parts of methacrylic acid (MAA), 24.1 parts of BzMA, and 27.1 parts of EHMA were added to the solution. Polymerization was performed at 40° C. for 4 hours to form a chain B, and thus a block copolymer was obtained. The acid value (theoretical acid value) of the chain B was 121.8 mgKOH/g. The theoretical acid value of the chain B was calculated according to the following procedures.

First of all, the amount of a constituent unit derived from MAA per 1 part of the chain B is determined by the following expression.

$$11.8/(11.8+24.1+27.1)=0.187 \text{ parts}$$

Subsequently, the theoretical acid value of the chain B is calculated by the following expression using the molecular weight "86.1" of MAA and the molecular weight "56.1" of KOH.

$$(0.187/86.1)\times56.1\times1{,}000=121.8 \text{ mgKOH/g}$$

The solid content and the conversion rate of polymerization, as measured by sampling part of the reaction solution, were 48.5% and about 100%, respectively. Mn and PDI of the obtained block copolymer were 30,000 and 1.43, respectively. The acid value (measured acid value) of the obtained block copolymer, as measured by titration using an ethanolic 0.1 N potassium hydroxide solution, was 30.8 mgKOH/g.

The solution of the obtained block copolymer was diluted by adding 56.2 parts of BDG thereto. The resultant diluted solution was neutralized by adding a mixed liquid of 9.1 parts of 28% ammonia water and 327.6 parts of ion-exchanged water under a room temperature condition to obtain polymer emulsion E-1. The solid content of E-1 was 26.4%. The number average particle size of the emulsion particles, as measured using a dynamic light scattering particle size distribution analyzer (particle size distribution analyzer, trade name "NICOMP 380ZLS-S," manufactured by Entegris, Inc.), was 86.0 nm.

Synthesis Examples 2 to 4

Polymer emulsions E-2 to E-4 were obtained in the same manner as in Synthesis Example 1 described above except that the compositions shown in Table 1 were adopted. The meanings of abbreviations in Table 1 are shown below.

MMA: methyl methacrylate
CHMA: cyclohexyl methacrylate
LMA: lauryl methacrylate
TBCHMA: t-butylcyclohexyl methacrylate
DMAE: dimethylaminoethanol
AMP: 2-amino-2-methyl-1-propanol

TABLE 1

| | | Synthesis Example 1 | Synthesis Example 2 | Synthesis Example 3 | Synthesis Example 4 |
|---|---|---|---|---|---|
| Name | | E-1 | E-2 | E-3 | E-4 |
| Chain A | Monomer group (i) | BzMA | MMA | BzMA | TBCHMA |
| | Monomer group (ii) | EHMA | EHMA | LMA | LMA |
| | Composition | BzMA/EHMA/HEMA | MMA/EHMA | BzMA/LMA/HEMA | TBCHMA/LMA |
| | Compositional ratio (mass ratio) | 43.2/48.6/8.2 | 32.0/68.0 | 59.5/31.8/8.7 | 56.0/44.0 |
| | Mn | 26,000 | 25,000 | 24,000 | 27,000 |
| | PDI | 1.28 | 1.31 | 1.25 | 1.33 |
| | Tg (° C.) | 19.5 | 18.4 | 3.7 | 21.4 |
| Chain B | Monomer group (i) | BzMA | CHMA | MMA | BzMA |
| | Monomer group (ii) | EHMA | EHMA | LMA | EHMA |
| | Composition | BzMA/EHMA/MAA | CHMA/EHMA/MAA | MMA/LMA/MAA | BzMA/EHMA/MAA |
| | Compositional ratio (mass ratio) | 38.3/43.0/18.9 | 46.5/34.9/18.6 | 48.8/32.6/18.6 | 40.5/40.5/19.0 |
| | Mn | 4,000 | 4,000 | 5,000 | 3,000 |
| | Theoretical acid value (mgKOH/g) | 121.8 | 121.2 | 121.2 | 124.1 |
| Whole | Composition | BzMA/EHMA/HEMA/MAA | MMA/EHMA/CHMA/MAA | BzMA/LMA/HEMA/MMA/MAA | TBCHMA/LMA/BzMA/EHMA/MAA |
| | Compositional ratio (mass ratio) | 42.0/47.2/6.1/4.7 | 23.8/59.5/11.9/4.8 | 44.4/32.0/6.5/12.4/4.7 | 41.9/32.9/10.2/10.2/4.8 |
| | Mn | 30,000 | 29,000 | 29,000 | 30,000 |
| | PDI | 1.43 | 1.46 | 1.41 | 1.48 |
| | Measured acid value (mgKOH/g) | 30.8 | 31.2 | 30.8 | 31.2 |
| | Neutralizer | Ammonia | Ammonia | DMAE | AMP |
| | Solid content (%) | 26.4 | 27.6 | 26.1 | 27.9 |
| | Number average particle size (nm) | 86.0 | 98.0 | 95.4 | 92.1 |

The glass transition temperature of each polymer was calculated using the following equation.

$$1/Tg = (W_A/Tg_A) + (W_B/Tg_B) + (W_C/Tg_C)$$

$W_A$: weight fraction of monomer A
$Tg_A$: glass transition temperature (K) of homopolymer of monomer A
$W_B$: weight fraction of monomer B
$Tg_B$: glass transition temperature (K) of homopolymer of monomer B

Synthesis Examples 5 to 7 and Comparative Synthesis Examples 1 to 3

Polymer emulsions E-5 to E-7 and F-1 to F-3 were obtained in the same manner as in Synthesis Example 1 described above except that the amounts of iodine and V-70 were appropriately adjusted and the compositions shown in Tables 2 and 3 were adopted.

TABLE 2

| | | Synthesis Example 5 | Synthesis Example 6 | Synthesis Example 7 |
|---|---|---|---|---|
| Name | | E-5 | E-6 | E-7 |
| Chain A | Monomer group (i) | BzMA | BzMA | BzMA |
| | Monomer group (ii) | EHMA | EHMA | EHMA |
| | Composition | BzMA/EHMA/HEMA | BzMA/EHMA/HEMA | BzMA/EHMA/HEMA |
| | Compositional ratio (mass ratio) | 43.2/48.6/8.2 | 43.2/48.6/8.2 | 43.2/48.6/8.2 |
| | Mn | 17,000 | 35,000 | 44,000 |
| | PDI | 1.27 | 1.35 | 1.34 |
| | Tg (° C.) | 19.5 | 19.5 | 19.5 |

TABLE 2-continued

|  |  | Synthesis Example 5 | Synthesis Example 6 | Synthesis Example 7 |
|---|---|---|---|---|
| Chain B | Monomer group (i) | BzMA | BzMA | BzMA |
|  | Monomer group (ii) | EHMA | EHMA | EHMA |
|  | Composition | BzMA/EHMA/MAA | BzMA/EHMA/MAA | BzMA/EHMA/MAA |
|  | Compositional ratio (mass ratio) | 38.3/43.0/18.9 | 38.3/43.0/18.9 | 38.3/43.0/18.9 |
|  | Mn | 5,000 | 4,000 | 3,000 |
|  | Theoretical acid value (mgKOH/g) | 121.8 | 121.8 | 121.8 |
| Whole | Composition | BzMA/EHMA/HEMA/MAA | BzMA/EHMA/HEMA/MAA | BzMA/EHMA/HEMA/MAA |
|  | Compositional ratio (mass ratio) | 42.0/47.2/6.1/4.7 | 42.0/47.2/6.1/4.7 | 42.0/47.2/6.1/4.7 |
|  | Mn | 22,000 | 39,000 | 47,000 |
|  | PDI | 1.33 | 1.55 | 1.6 |
|  | Measured acid value (mgKOH/g) | 30.5 | 30.7 | 31.2 |
|  | Neutralizer | Ammonia | Ammonia | Ammonia |
|  | Solid content (%) | 27.6 | 26.1 | 24.3 |
|  | Number average particle size (nm) | 68.3 | 103.6 | 112.3 |

TABLE 3

|  |  | Comparative Synthesis Example 1 | Comparative Synthesis Example 2 | Comparative Synthesis Example 3 |
|---|---|---|---|---|
| Name |  | F-1 | F-2 | F-3 |
| Chain A | Monomer group (i) | BzMA | BzMA | BzMA |
|  | Monomer group (ii) | EHMA | — | EHMA |
|  | Composition | BzMA/EHMA/HEMA | BzMA/HEMA | CHMA/EHMA |
|  | Compositional ratio (mass ratio) | 43.2/48.6/8.2 | 91.4/8.6 | 60.0/40.0 |
|  | Mn | 8,000 | 25,000 | 31,000 |
|  | PDI | 1.23 | 1.27 | 1.32 |
|  | Tg (° C.) | 19.5 | 54.1 | 38.9 |
| Chain B | Monomer group (i) | BzMA | BzMA | BzMA |
|  | Monomer group (ii) | EHMA | — | — |
|  | Composition | BzMA/EHMA/MAA | BzMA/MAA | BzMA/MAA |
|  | Compositional ratio (mass ratio) | 38.3/43.0/18.9 | 80.4/19.6 | 81.4/18.6 |
|  | Mn | 5,000 | 5,000 | 4,000 |
|  | Theoretical acid value (mgKOH/g) | 121.8 | 128.0 | 121.2 |
| Whole | Composition | BzMA/EHMA/HEMA/MAA | BzMA/HEMA/MAA | CHMA/EHMA/BzMA/MAA |
|  | Compositional ratio (mass ratio) | 42.0/47.2/6.1/4.7 | 88.5/6.5/5.0 | 44.6/29.8/20.8/4.8 |
|  | Mn | 13,000 | 30,000 | 35,000 |
|  | PDI | 1.29 | 1.38 | 1.46 |
|  | Measured acid value (mgKOH/g) | 30.7 | 32.5 | 31.0 |
|  | Neutralizer | Ammonia | Ammonia | Ammonia |
|  | Solid content (%) | 30.4 | 22.7 | 25.1 |
|  | Number average particle size (nm) | Unmeasurable (almost transparent) | 98.0 | 123.5 |

Comparative Synthesis Example 4

In a reaction container of the same type as the reaction container used in Synthesis Example 1, 300 parts of ion-exchanged water was placed and heated to 75° C., and then 1 part of sodium persulfate was added thereto. In another container, 100 parts of styrene, 50 parts of butyl acrylate, 50 parts of 2-ethylhexyl acrylate, and 6 parts of a reactive surfactant (trade name "Aqualon KH-10," manufactured by DKS Co. Ltd.) were placed and mixed to prepare a uniform monomer mixed liquid. The prepared monomer mixed liquid was dropped into the reaction container over 2 hours using a dropping funnel, and the resultant mixture was then reacted at 75° C. for 4 hours to obtain bluish white polymer emulsion F-4 which was somewhat transparent. With regard to polymer emulsion F-4 obtained, the solid content was 39.6%, the viscosity was 53 mPa·s, and the number average particle size of the emulsion particles was 115 nm.

Comparative Synthesis Example 5

In a reaction container of the same type as the reaction container used in Synthesis Example 1, 200 parts of ion-exchanged water was placed, and 80 parts of styrene acrylic acid (acid value 260 mgKOH/g, number average molecular weight 2,300) and 22.5 parts of 28% ammonia water were added under stirring at room temperature to ionize the and dissolve the styrene acrylic acid in water. The resultant mixture was heated to 75° C., and then 6 parts of potassium persulfate was added thereto. A mixture of 30 parts of styrene and 30 parts of butyl acrylate was dropped into the reaction container over 2 hours using a dropping funnel, and the resultant mixture was reacted at 75° C. for 3 hours to obtain yellowish white and semitransparent polymer emulsion F-5. With regard to polymer emulsion F-5 obtained, the solid content was 39.9%, the viscosity was 288 mPa·s, and the number average particle size of the emulsion particles was 80 nm.

<Production of Polymer Emulsion (Second Binder Component)>

Synthesis Example 8

In a reaction container of the same type as the reaction container used in Synthesis Example 1, 100 parts of an oxidized polyethylene wax (melting point 100° C., acid value 20 mgKOH/g) and 100 parts of toluene were placed and heated to 90° C. to make the resultant mixture uniform. A mixture of 3.3 parts of dimethylaminoethanol and 368.1 parts of ion-exchanged water was gradually added thereto under vigorous stirring so as not to lower the temperature, and thus emulsification was performed by phase transition. Toluene and water were distilled away by heating, and the heating was continued until the toluene was not detected by gas chromatography. Ion-exchanged water was added to make the solid content 20% to obtain yellowish semitransparent polymer emulsion O-1. With regard to polymer emulsion O-1 obtained, pH was 8.8, and the number average particle size of the emulsion particles was 86.3 nm.

Synthesis Examples 9 to 11

Polymer emulsions O-2 to O-4 were obtained in the same manner as in Synthesis Example 8 described above except that polyolefins of the types shown in Table 4 were used.

was added thereto to obtain an aqueous solution of pigment dispersant G-1. Mn, PDI, the acid value, and NV of pigment dispersant G-1 (polymer) obtained were 13,200, 2.15, 129.0 mgKOH/g, and 25.0%, respectively.

Synthesis Example 13

In a reaction container of the same type as the reaction container used in Synthesis Example 1, 350.5 parts of BDG, 2.0 parts of iodine, 7.4 parts of V-70, 0.1 parts of iodosuccinimide (NIS), 52.8 parts of BzMA, and 99.4 parts of CHMA were placed. The resultant mixture was heated to 45° C. and stirred for 2 hours, and it was ascertained that the brown color of iodine had disappeared and a polymerization initiation compound (iodine compound) had been formed. The mixture was further stirred and reacted at 45° C. for 3 hours, and thus a polymer (chain C) was synthesized. The solid content and the conversion rate of polymerization, as measured by sampling part of the reaction solution, were 30.1% and about 100%, respectively. Mn and PDI of the chain C were 5,600 and 1.19, respectively.

The temperature of the solution of the obtained chain C was lowered to 40° C., and then 15.1 parts of MAA and 61.6 parts of BzMA were added thereto. Polymerization was performed at 40° C. for 4 hours to form a chain D, and thus a block copolymer was obtained. The conversion rate of polymerization was about 100%. The acid value (theoretical acid value) of the chain D was 128.4 mgKOH/g. Mn, PDI, and the acid value of the obtained block copolymer were 8,800, 1.29, and 43.0 mgKOH/g, respectively. To the solution of the obtained block copolymer, a mixture of 12 parts of 28% ammonia water and 217 parts of water was added to obtain a yellow and transparent aqueous solution (solid content 27.9%) of pigment dispersant G-2.

TABLE 4

| | | Synthesis Example 8 | Synthesis Example 9 | Synthesis Example 10 | Synthesis Example 11 |
|---|---|---|---|---|---|
| Name | | O-1 | O-2 | O-3 | O-4 |
| Polyolefin | Type | Oxidized polyethylene wax | Oxidized polyethylene wax | Polyethylene acrylic acid | Graft product of polypropylene and maleic anhydride |
| | Melting point (° C.) | 100.0 | 137.0 | 79.8 | 70.0 |
| | Acid value (mgKOH/g) | 20.0 | 56.0 | 116.0 | 33.3 |
| Solid content (%) | | 20.0 | 20.0 | 20.0 | 20.0 |
| pH | | 8.8 | 9.3 | 9.1 | 8.9 |
| Number average particle size (nm) | | 86.3 | 61.0 | 43.0 | 135.0 |

<Production of Pigment Dispersant>

Synthesis Example 12

In a reaction container of the same type as the reaction container used in Synthesis Example 1, 50 parts of propylene glycol monopropyl ether (PGP) and 50 parts of dipropylene glycol monomethyl ether (DPGM) were placed and heated to 80° C. In another container, 20 parts of styrene, 20 parts of MMA, 20 parts of butyl acrylate, 20 parts of HEMA, 20 parts of MAA, and 1.5 parts of 2,2-azobisisobutyronitrile (AIBN) were placed and stirred to prepare a uniform monomer solution. The prepared monomer solution was dropped into the reaction container over 2 hours. One hour after the dropping, 1.5 parts of AIBN was added, and the resultant mixture was reacted at 80° C. for further 5 hours. After cooling the reaction solution, a mixture of 9.3 parts of sodium hydroxide and 190.7 parts of ion-exchanged water <Production of Aqueous Inkjet Ink>

Example 1

To 675 parts of ion-exchanged water and 50 parts of BDG, 140 parts (containing 35 parts of the polymer, 17.5 parts of PGP, and 17.5 parts of DPGM) of the aqueous solution of pigment dispersant G-1 and 150 parts of C.I. Pigment Blue 15:3 (PB 15:3, manufactured by Dainichiseika Color & Chemicals Mfg. Co., Ltd.) were added, and the resultant mixture was sufficiently stirred and mixed with a dissolver to obtain a mixture containing a pigment and a pigment dispersant. The obtained mixture was placed in a paint shaker in which zirconia beads (diameter 1 mm) were placed as dispersion media and in which the filling rate of the dispersion media was 40% by volume to perform a dispersion treatment for 120 minutes, and thus a pigment dispersion was obtained. The obtained pigment dispersion was subjected to a centrifugal separation treatment (7,500 rpm for 20 minutes) and then to filtration with a 10 μm membrane filter, and thereby coarse particles were removed. The concentration was adjusted by adding ion-exchanged water to obtain a blue aqueous pigment dispersion having a pigment concentration of 14%.

Mixed were 145.5 parts (containing 38.4 parts of the polymer and 50.0 parts of BDG) of polymer emulsion E-1 and 405.5 parts of water, and the resultant mixture was made uniform. To the mixture, 48.0 parts of polymer emulsion O-1, 120 parts of propylene glycol, 1 part of ammonia water, 30 parts of a 1% aqueous solution of a fluorine-based surfactant (trade name "SURFLON S-211," manufactured by AGC Inc.), and 250 parts of the blue aqueous pigment dispersion were added to make the total 1000 parts. The resultant mixture was stirred for 10 minutes, and then coarse particles were removed by filtration with a 5 μm membrane filter, and thus blue ink IJI-01 for inkjet was obtained.

The viscosity of ink IJI-01 at 25° C., as measured using an E-type viscometer under a condition of 60 rpm, was 3.63 mPa·s, and pH of ink IJI-01, as measured using a pH meter, was 8.9. In addition, the number average particle size of the particles in ink IJI-01 was 123 nm. Ink IJI-01 was placed in a thermostatic chamber and stored at 70° C. for 1 week. With regard to ink IJI-01 after the storage, the viscosity was 3.86 mPa·s and the number average particle size of the particles was 132 nm.

Further, the redissolvability of the ink (polymer) was evaluated according to the procedures described below. First of all, one drop of ink IJI-01 was dropped on a glass plate and left to stand at room temperature for 24 hours to form a somewhat dried film. Subsequently, a mixed liquid of water/ammonia water/propylene glycol/BDG (volume ratio=60/10/15/15) was added to the formed film. Then, the redissolvability of the ink (polymer) was evaluated according to the evaluation criteria described below. The redissolvability of ink IJI-01 was "C."

[Evaluation Criteria for Redissolvability]
Excellent: at the point in time when the mixed liquid is added, the film dissolves and quickly turns back into the form of ink.
Good: the film turns back into the form of ink almost without leaving a film piece.
Fair: the film turns back into the form of ink although some film pieces are left.
Poor: bleed-out is recognized, but a large film piece is left.
Extremely poor: the film does not dissolve and shows no change.

Examples 2 to 5

Inks IJI-02 to IJI-05 for inkjet were obtained in the same manner as in Example 1 described above except that the compositions shown in Tables 5 and 6 were adopted. The physical properties and the like of each ink obtained are shown in Tables 5 and 6. Note that the meanings of abbreviations (pigments) in Tables 5 and 6 are shown below.
PR 122: C.I. Pigment Red 122 (manufactured by Dainichiseika Color & Chemicals Mfg. Co., Ltd.)
PY 155: C.I. Pigment Yellow 155 (manufactured by Clariant (Japan) K.K.)
PBk 7: C.I. Pigment Black 7 (manufactured by Degussa AG)

Example 6

To 271 parts of ion-exchanged water and 50 parts of BDG, 179 parts (containing 50 parts of the polymer and 76.7 parts of BDG) of the aqueous solution of pigment dispersant G-2 and 500 parts of C.I. Pigment White 6 (PW6, manufactured by ISHIHARA SANGYO KAISHA, LTD.) were added, and the resultant mixture was sufficiently stirred and mixed with a dissolver to obtain a mixture containing a pigment and a pigment dispersant. The obtained mixture was placed in a paint shaker in which zirconia beads (diameter 1 mm) were placed as dispersion media and in which the filling rate of the dispersion media was 40% by volume to perform a dispersion treatment for 120 minutes, and thus a pigment dispersion was obtained. The obtained pigment dispersion was subjected to filtration with a 10 μm membrane filter to remove coarse particles, and thus a white aqueous pigment dispersion having a pigment concentration of 50% was obtained.

Mixed were 170.5 parts (containing 45 parts of the polymer and 61.2 parts of BDG) of polymer emulsion E-1, 56.2 parts (containing 11.2 parts of the polymer) of polymer emulsion O-1, 443.3 parts of ion-exchanged water, 120 parts by mass of propylene glycol, 30 parts of a 1% aqueous solution of an acetylene-based surfactant (trade name "SURFYNOL 465," manufactured by Nissin Chemical Industry Co., Ltd.), and 180 parts of the aqueous pigment dispersion to make the total 1000 parts. The resultant mixture was stirred for 10 minutes, and then coarse particles were removed by filtration with a 5 μm membrane filter, and thus white ink IJI-06 for inkjet was obtained. The physical properties and the like of ink IJI-06 obtained are shown in Table 6.

TABLE 5

| | | Example 1 | Example 2 | Example 3 |
|---|---|---|---|---|
| Name | | IJI-01 | IJI-02 | IJI-03 |
| Pigment | | PB15:3 | PB15:3 | PR122 |
| First binder component | | E-1 | E-1 | E-1 |
| Second binder component | | O-1 | O-1 | O-1 |
| Mass (solid content) ratio of first binder component to second binder component | | 100:25 | 100:25 | 100:25 |
| Pigment dispersant | | G-1 | G-2 | G-2 |
| pH | | 9.8 | 9.8 | 9.8 |
| Number average particle size (nm) | Initial | 123 | 99 | 105 |
| | After storage of 70° C. for 1 week | 132 | 98 | 101 |
| Viscosity (mPa · s) | Initial | 3.63 | 3.11 | 3.06 |
| | After storage of 70° C. for 1 week | 3.86 | 3.10 | 3.03 |
| Redissolvability | | Fair | Good | Good |

TABLE 6

| | | Example 4 | Example 5 | Example 6 |
|---|---|---|---|---|
| Name | | IJI-04 | IJI-05 | IJI-06 |
| Pigment | | PY155 | PBk7 | PW6 |
| First binder component | | E-1 | E-1 | E-1 |
| Second binder component | | O-1 | O-1 | O-1 |
| Mass (solid content) ratio of first binder component to second binder component | | 100:25 | 100:25 | 100:25 |
| Pigment dispersant | | G-2 | G-2 | G-2 |
| pH | | 9.8 | 9.8 | 9.8 |
| Number average particle size (nm) | Initial | 106 | 111 | 214 |
| | After storage of 70° C. for 1 week | 107 | 110 | 235 |
| Viscosity (mPa · s) | Initial | 3.03 | 3.03 | 5.12 |
| | After storage of 70° C. for 1 week | 3.01 | 3.00 | 5.37 |
| Redissolvability | | Good | Good | Good |

Examples 7 to 17

Inks IJI-07 to IJI-17 for inkjet were obtained in the same manner as in Example 1 described above except that the compositions shown in Tables 7 and 8 were adopted. The physical properties and the like of each ink obtained are shown in Tables 7 and 8.

TABLE 7

|  |  | Example 7 | Example 8 | Example 9 | Example 10 | Example 11 | Example 12 |
|---|---|---|---|---|---|---|---|
|  | Name | IJI-07 | IJI-08 | IJI-09 | IJI-10 | IJI-11 | IJI-12 |
|  | Pigment |  |  |  | PB15:3 |  |  |
|  | First binder component | E-2 | E-3 | E-4 | E-5 | E-6 | E-7 |
|  | Second binder component |  |  |  | O-1 |  |  |
|  | Mass (solid content) ratio of first binder component to second binder component |  |  |  | 100:25 |  |  |
|  | Pigment dispersant |  |  |  | G-2 |  |  |
|  | pH | 9.8 | 9.8 | 9.8 | 9.6 | 9.8 | 9.8 |
| Number average particle size (nm) | Initial | 98 | 101 | 100 | 89 | 100 | 106 |
|  | After storage of 70° C. for 1 week | 95 | 100 | 99 | 91 | 95 | 110 |
| Viscosity (mPa · s) | Initial | 3.11 | 3.20 | 3.12 | 3.33 | 3.22 | 3.45 |
|  | After storage of 70° C. for 1 week | 3.10 | 3.15 | 3.12 | 3.10 | 3.06 | 3.18 |
|  | Redissolvability | Good | Excellent | Excellent | Good | Good | Good |

TABLE 8

|  |  | Example 13 | Example 14 | Example 15 | Example 16 | Example 17 |
|---|---|---|---|---|---|---|
|  | Name | IJI-13 | IJI-14 | IJI-15 | IJI-16 | IJI-17 |
|  | Pigment |  |  | PB15:3 |  |  |
|  | First binder component |  |  | E-1 |  |  |
|  | Second binder component | O-2 | O-3 | O-4 | O-4 | O-4 |
|  | Mass (solid content) ratio of first binder component to second binder component | 100:25 | 100:25 | 100:25 | 100:50 | 100:100 |
|  | Pigment dispersant |  |  | G-2 |  |  |
|  | pH | 9.8 | 9.8 | 9.8 | 9.8 | 9.8 |
| Number average particle size (nm) | Initial | 98 | 102 | 99 | 99 | 110 |
|  | After storage of 70° C. for 1 week | 98 | 98 | 100 | 100 | 108 |
| Viscosity (mPa · s) | Initial | 3.01 | 3.05 | 3.07 | 3.05 | 2.98 |
|  | After storage of 70° C. for 1 week | 3.06 | 2.98 | 3.00 | 3.11 | 3.03 |
|  | Redissolvability | Good | Good | Good | Good | Fair |

Comparative Examples 1 to 7

Inks CIJI-01 to CIJI-07 for inkjet were obtained in the same manner as in Example 1 described above except that the compositions shown in Table 9 were adopted. The physical properties and the like of each ink obtained are shown in Table 9.

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
|  | Name | CIJI-01 | CIJI-02 | CIJI-03 | CIJI-04 | CIJI-05 | CIJI-06 | CIJI-07 |
|  | Pigment |  |  |  | PB15:3 |  |  |  |
|  | First binder component | — | E-1 | F-1 | F-2 | F-3 | F-4 | F-5 |
|  | Second binder component | O-1 | — |  |  | O-1 |  |  |
|  | Mass (solid content) ratio of first binder component to second binder component | 0:100 | 100:0 | 100:25 | 100:25 | 100:25 | 100:25 | 100:25 |
|  | Pigment dispersant |  |  |  | G-2 |  |  |  |
|  | pH | 9.8 | 9.8 | 9.8 | 9.8 | 9.8 | 9.6 | 9.4 |
| Number average particle size (nm) | Initial | 100 | 98 | 97 | 98 | 97 | 99 | 100 |
|  | After storage of 70° C. for 1 week | 102 | 98 | 96 | 94 | 98 | 96 | 135 |

-continued

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Viscosity (mPa · 3) | Initial | 3.06 | 3.04 | 3.03 | 3.03 | 3.04 | 2.98 | 3.48 |
|  | After storage of 70° C. for 1 week | 3.06 | 3.02 | 3.04 | 3.03 | 3.03 | 3.00 | 3.68 |
|  | Redissolvability | Good | Good | Good | Good | Good | Poor to Extremely poor | Poor |

<Production of Printed Matter>

Examples 18 to 36 and Comparative Examples 8 to 14

An inkjet printing machine (trade name "MMP 825H," manufactured by Mastermind Co., Ltd.) equipped with a plate heater, and substrates to be printed, which are described below, were prepared. Then, an image was recorded by an inkjet recording method using each of prepared inks for inkjet to obtain printed matter. Specifically, each of the substrates to be printed was heated using the plate heater such that the surface temperature reached 50° C., and then each ink was applied thereon to obtain printed matter.

[Substrates to be Printed (Films)]
  Polyvinyl chloride: trade name "Controltac 180-10," manufactured by 3M Company
  Polyethylene: LDPE film, manufactured by Takigawa Corporation Japan, thickness 30 μm
  Polypropylene: trade name "Yupo 80 (UV) KV11," manufactured by LINTEC Corporation <Evaluation>

(Ejection Performance)

Ejection performance of each ink was evaluated according to the evaluation criteria described below by visually observing the ejected state and the like of the ink ejected from the recording head of the inkjet printing machine. Results are shown in Table 10.
  Good: the ink can be ejected without a problem, and a favorable image can be printed.
  Fair: scattering of microfine droplets is recognized.
  Poor: droplets are scattered in ejecting the ink, and the image is disturbed.

(Adhesiveness)

The adhesiveness of the image to each substrate to be printed was evaluated by a cellophane tape-peeling test. Specifically, after the printed matter was sufficiently dried using a dryer, a cellophane tape (trade name "Cellotape (R)," manufactured by Nichiban Co., Ltd.) was pressed sufficiently against a solid part of the image, and then the cellophane tape was peeled. Then, the extent of the image peeled was visually observed to evaluate the adhesiveness according to the evaluation criteria described below. Results are shown in Table 10.
  Excellent: the image is not peeled at all.
  Good: the image is slightly peeled.
  Fair: the area of the image peeled is smaller than the area of the image left unpeeled.
  Poor: the area of the image peeled is larger than the area of the image left unpeeled.

(Rub Resistance)

Each of the following tests (1) and (2) was performed using a Gakushin-type rubbing tester (trade name "RT-300," manufactured by DAIEI KAGAKU SEIKI MFG. Co., LTD.).
  (1) Dry rubbing. The surface of the image of the printed matter obtained is rubbed back and forth 20 times with a load of 500 g using dry white cloth.
  (2) Wet rubbing. The surface of the image of the printed matter obtained is rubbed back and forth 20 times with a load of 500 g using white cloth wetted with water.

The state of the image after the rubbing was visually observed to evaluate the rub resistance according to the evaluation criteria described below. Results are shown in Table 10.
  Excellent: the image is not peeled at all.
  Good: the image is slightly peeled.
  Fair: the area of the image peeled is smaller than the area of the image left unpeeled.
  Poor: the area of the image peeled is larger than the area of the image left unpeeled.

TABLE 10

|  | Ink | Substrate to be printed (Film) | Ejection performance | Adhesiveness | Rub resistance Dry rubbing | Rub resistance Wet rubbing |
|---|---|---|---|---|---|---|
| Example 18 | IJI-01 | Polyvinyl chloride | Fair | Excellent | Excellent | Excellent |
| Example 19 | IJI-02 | Polyvinyl chloride | Good | Excellent | Excellent | Excellent |
| Example 20 | IJI-02 | Polyethylene | Good | Excellent | Excellent | Excellent |
| Example 21 | IJI-02 | Polypropylene | Good | Good | Good | Good |
| Example 22 | IJI-03 | Polyethylene | Good | Excellent | Excellent | Excellent |
| Example 23 | IJI-04 | Polyethylene | Good | Excellent | Excellent | Excellent |
| Example 24 | IJI-05 | Polyethylene | Good | Excellent | Excellent | Excellent |
| Example 25 | IJI-06 | Polyethylene | Good | Excellent | Excellent | Excellent |
| Example 26 | IJI-07 | Polypropylene | Good | Good | Good | Good |
| Example 27 | IJI-08 | Polypropylene | Good | Good | Good | Good |
| Example 28 | IJI-09 | Polypropylene | Good | Excellent | Good | Good |
| Example 29 | IJI-10 | Polypropylene | Good | Fair | Good | Good |
| Example 30 | IJI-11 | Polypropylene | Good | Good | Good | Good |

TABLE 10-continued

|  | Ink | Substrate to be printed (Film) | Ejection performance | Adhesiveness | Rub resistance Dry rubbing | Wet rubbing |
|---|---|---|---|---|---|---|
| Example 31 | IJI-12 | Polypropylene | Good | Good | Good | Good |
| Example 32 | IJI-13 | Polypropylene | Good | Good | Good | Good |
| Example 33 | IJI-14 | Polypropylene | Good | Good | Good | Good |
| Example 34 | IJI-15 | Polypropylene | Good | Excellent | Good | Good |
| Example 35 | IJI-16 | Polypropylene | Good | Excellent | Excellent | Excellent |
| Example 36 | IJI-17 | Polypropylene | Good | Excellent | Excellent | Excellent |
| Comparative Example 8 | CIJI-01 | Polyethylene | Fair | Good | Poor | Fair |
| Comparative Example 9 | CIJI-02 | Polyethylene | Good | Good | Poor | Poor |
| Comparative Example 10 | CIJI-03 | Polypropylene | Good | Poor | Poor | Poor |
| Comparative Example 11 | CIJI-04 | Polypropylene | Good | Fair | Poor | Poor |
| Comparative Example 12 | CIJI-05 | Polypropylene | Good | Fair | Fair | Fair |
| Comparative Example 13 | CIJI-06 | Polypropylene | Poor | Good | Good | Good |
| Comparative Example 14 | CIJI-07 | Polypropylene | Poor | Good | Good | Fair |

INDUSTRIAL APPLICABILITY

The A-B block copolymer of the present invention is useful as a binder component for an aqueous inkjet ink that is excellent in inkjet printability and is capable of forming a printed film excellent in durability on a polyolefin-based plastic film.

The invention claimed is:

1. An A-B block copolymer having a chain A and a chain B and satisfying the following requirements (1-1) to (1-3):
   (1-1) comprising 90% by mass or more of a constituent unit derived from at least one selected from the group consisting of methacrylic acid and a methacrylate-based monomer,
   having a number average molecular weight of 20,000 to 60,000, and
   having a molecular weight distribution (weight average molecular weight/number average molecular weight) of 1.8 or less;
   (1-2) the chain A has a constituent unit (A-i) derived from at least one selected from a monomer group (i) consisting of methyl methacrylate, benzyl methacrylate, cyclohexyl methacrylate, and t-butylcyclohexyl methacrylate, and a constituent unit (A-ii) derived from at least one selected from a monomer group (ii) consisting of 2-ethylhexyl methacrylate, lauryl methacrylate, tridecyl methacrylate, stearyl methacrylate, and behenyl methacrylate,
   a total content of the constituent unit (A-i) and the constituent unit (A-ii) is 80% by mass or more and a content of the constituent unit (A-ii) is 20 to 80% by mass in the chain A, and
   the chain A has a glass transition temperature of 30° C. or lower,
   has a number average molecular weight of 15,000 to 50,000, and
   has a molecular weight distribution (weight average molecular weight/number average molecular weight) of 1.6 or less; and
   (1-3) the chain B has a constituent unit (B) derived from methacrylic acid, a constituent unit (B-i) derived from at least one selected from the monomer group (i) consisting of methyl methacrylate, benzyl methacrylate, cyclohexyl methacrylate, and t-butylcyclohexyl methacrylate, and a constituent unit (B-ii) derived from at least one selected from the monomer group (ii) consisting of 2-ethylhexyl methacrylate, lauryl methacrylate, tridecyl methacrylate, stearyl methacrylate, and behenyl methacrylate,
   a total content of the constituent unit (B-i) and the constituent unit (B-ii) in the chain (B) is 80% by mass or more based on a total content of the constituent units other than the constituent unit (B), and
   the chain B has an acid value of 50 to 250 mgKOH/g, and
   has a number average molecular weight of 1,000 to 10,000.

2. A polymer emulsion to be used as a binder component for an aqueous inkjet ink, wherein
   the polymer emulsion comprises first emulsion particles obtained in such a way that the A-B block copolymer according to claim 1 is neutralized with an alkali substance and dispersed by self-emulsification in an aqueous medium, and
   the first emulsion particles have a number average particle size of 30 to 300 nm.

3. An aqueous inkjet ink for printing on a plastic film, the aqueous inkjet ink comprising:
   a pigment;
   a polymer binder;
   water; and
   a water-soluble organic solvent, wherein
   the polymer binder comprises a first binder component and a second binder component,
   the first binder component is the polymer emulsion according to claim 2, and
   the second binder component is a polymer emulsion satisfying the following requirements (2-1) to (2-3):
   (2-1) comprising second emulsion particles obtained in such a way that in a second polymer that is at least one selected from the group consisting of polyethylene, polypropylene, poly(α-olefin), and copolymers thereof each having a carboxy group, the carboxy group is neutralized with an alkali substance and is dispersed by self-emulsification in an aqueous medium;

(2-2) the second polymer has an acid value of 10 to 150 mgKOH/g; and (2-3) the second emulsion particles have a number average particle size of 30 to 300 nm.

4. The aqueous inkjet ink according to claim 3, wherein
a solid content of the polymer binder based on 100 parts by mass of the pigment is 50 to 505 parts by mass,
a solid content of the first binder component based on 100 parts by mass of the pigment is 5 to 500 parts by mass, and
a solid content of the second binder component based on 100 parts by mass of the pigment is 5 to 500 parts by mass.

5. The aqueous inkjet ink according to claim 3, further comprising a pigment dispersant obtained by neutralizing a vinyl-based polymer having a number average molecular weight of 1,000 to 20,000 and an acid value of 50 to 250 mgKOH/g with an alkali substance, the pigment dispersant being in a finely dispersed or dissolved state.

6. The aqueous pigment inkjet ink according to claim 5, wherein the vinyl-based polymer is a block copolymer having a chain C and a chain D and satisfying the following requirements (3-1) to (3-3):

(3-1) comprising 90% by mass or more of a constituent unit derived from a methacrylate-based monomer, and having a number average molecular weight of 3,000 to 20,000;

(3-2) the chain C has a constituent unit (C-i) derived from at least one selected from a monomer group (i) consisting of methyl methacrylate, benzyl methacrylate, cyclohexyl methacrylate, and t-butylcyclohexyl methacrylate, a content of the constituent unit (C-i) in the chain C is 80% by mass or more, and the chain C has a number average molecular weight of 2,000 to 10,000, and has a molecular weight distribution of 1.6 or less; and (3-3) the chain D has a constituent unit (D) derived from methacrylic acid and a constituent unit (D-i) derived from at least one selected from the monomer group (i) consisting of methyl methacrylate, benzyl methacrylate, cyclohexyl methacrylate, and t-butylcyclohexyl methacrylate, a content of the constituent unit (D-i) in the chain D is 80% by mass or more, and the chain D has an acid value of 70 to 250 mgKOH/g.

7. The aqueous inkjet ink according to claim 5, wherein a solid content of the pigment dispersant based on 100 parts by mass of the pigment is 5 to 100 parts by mass.

8. The aqueous inkjet ink according to claim 3, wherein the water-soluble organic solvent comprises: propylene glycol; and at least one selected from the group consisting of diethylene glycol monobutyl ether, propylene glycol monomethyl ether, propylene glycol monoethyl ether, propylene glycol monopropyl ether, and dipropylene glycol monomethyl ether, and a content of the water-soluble organic solvent is 3 to 30% by mass.

9. The aqueous inkjet ink according to claim 3, wherein the plastic film is at least one selected from the group consisting of a polyethylene-based substrate and a polypropylene-based substrate.

* * * * *